US009199182B2

(12) United States Patent
Hunts

(10) Patent No.: US 9,199,182 B2
(45) Date of Patent: Dec. 1, 2015

(54) CONNECTION SYSTEM FOR MECHANICAL COMPONENTS

(76) Inventor: Larry David Hunts, Trail, OR (US)

( * ) Notice: Subject to any disclaimer, the term of this patent is extended or adjusted under 35 U.S.C. 154(b) by 680 days.

(21) Appl. No.: 13/416,683

(22) Filed: Mar. 9, 2012

(65) Prior Publication Data

US 2012/0227245 A1    Sep. 13, 2012

Related U.S. Application Data

(60) Provisional application No. 61/452,043, filed on Mar. 11, 2011.

(51) Int. Cl.
    *A63H 33/04*    (2006.01)
    *A63H 33/12*    (2006.01)
    *A63H 33/10*    (2006.01)
    *F16B 7/04*    (2006.01)

(52) U.S. Cl.
CPC ............ *A63H 33/101* (2013.01); *F16B 7/0433* (2013.01); *Y10T 29/49947* (2015.01); *Y10T 403/59* (2015.01)

(58) Field of Classification Search
USPC ................ 446/102, 104, 107, 109, 119–128; 273/157 R
See application file for complete search history.

(56) References Cited

U.S. PATENT DOCUMENTS

| 4,129,975 | A | * | 12/1978 | Gabriel | ........................ 52/655.2 |
| 5,183,430 | A | * | 2/1993 | Swann | ........................... 446/104 |
| 5,199,919 | A | * | 4/1993 | Glickman | ..................... 446/126 |
| 5,542,871 | A | * | 8/1996 | Gabriel | ......................... 446/126 |
| 5,904,606 | A | * | 5/1999 | Zimmer et al. | ............... 446/108 |
| 7,510,457 | B2 | | 3/2009 | Hussa-Lietz | |
| 7,588,476 | B2 | | 9/2009 | Hammond | |

* cited by examiner

*Primary Examiner* — Nini Legesse
(74) *Attorney, Agent, or Firm* — Klarquist Sparkman, LLP

(57) ABSTRACT

Disclosed herein are building components, systems and methods of constructing and uses thereof. In some examples, a building component is disclosed including a housing with at least one recess and at least one connector assembly disposed within the at least one recess within the housing, wherein each connector assembly includes a shaft capable of being received by the at least one recess within the housing and at least one latching mechanism disposed on the shaft and configured to form a releasable connection with another building component.

21 Claims, 22 Drawing Sheets

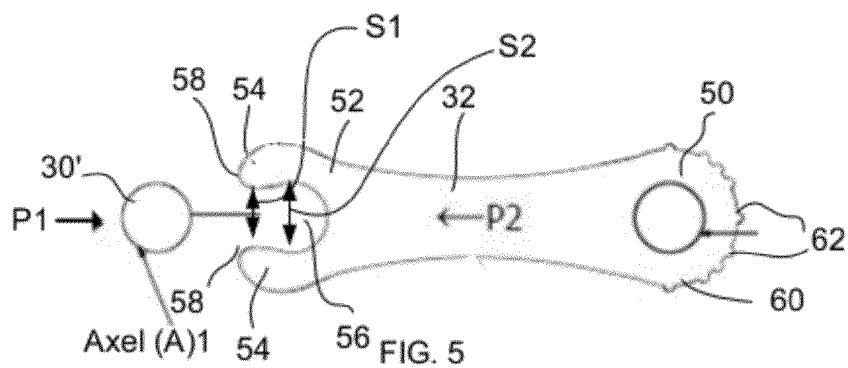
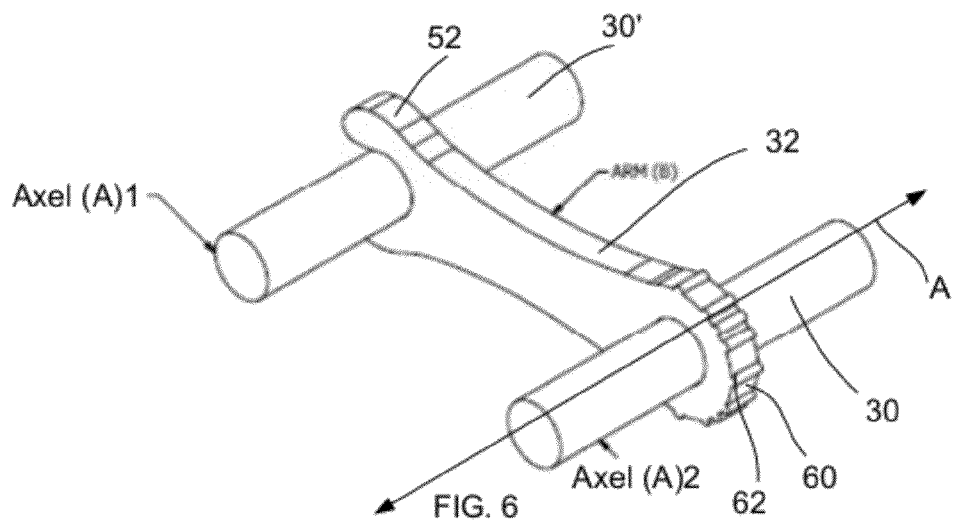
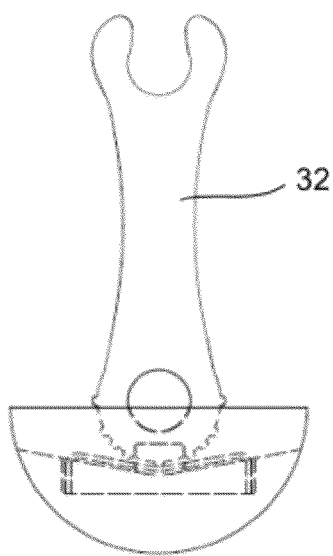
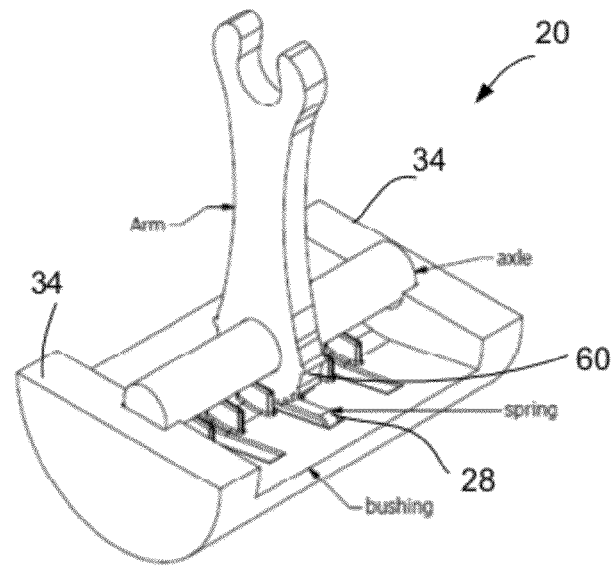
FIG. 7
FIG. 8

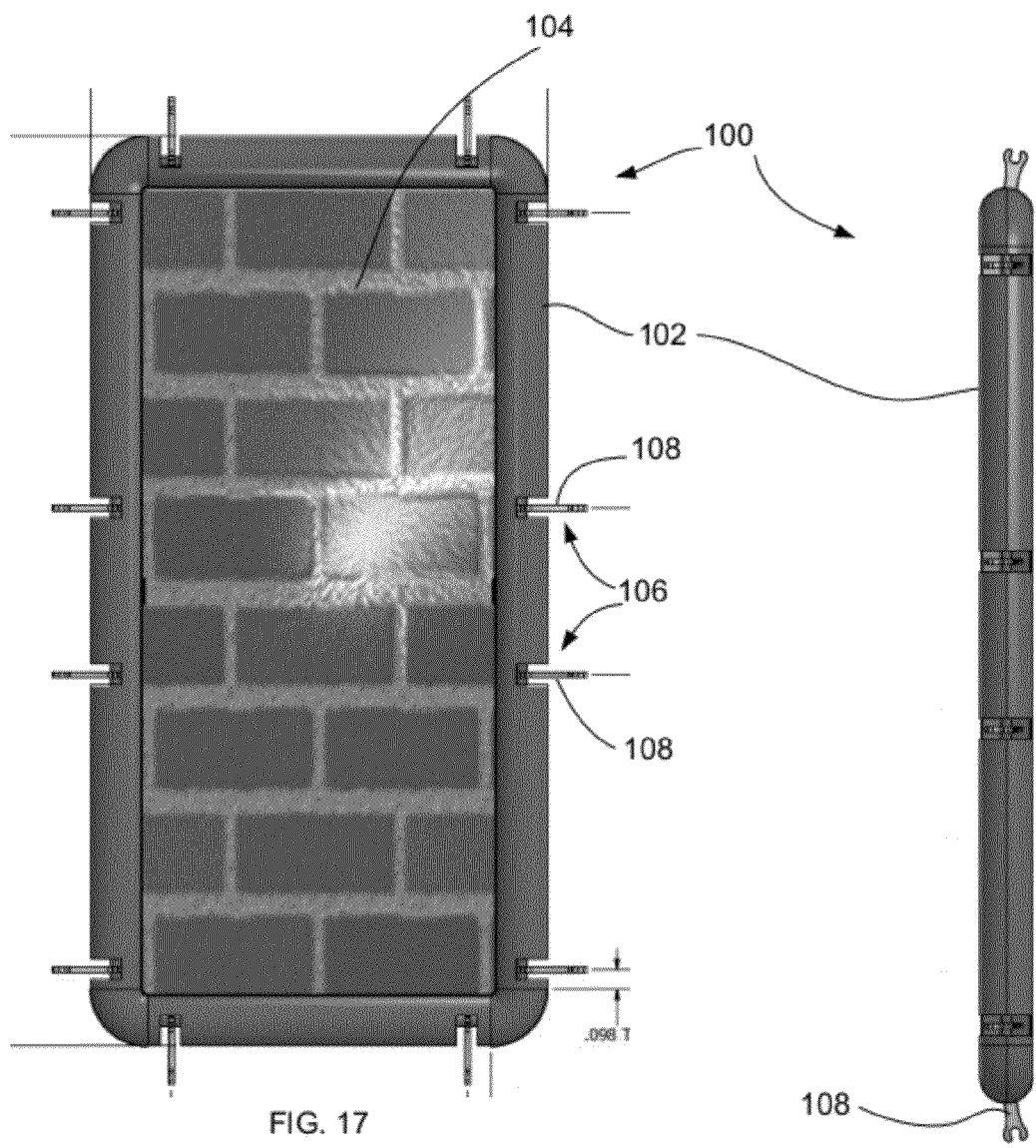
FIG. 17
FIG. 18
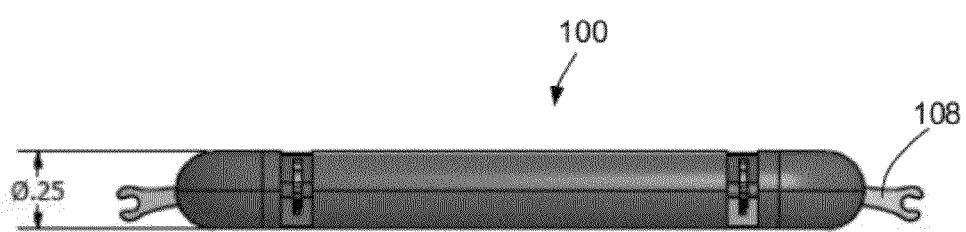
FIG. 19

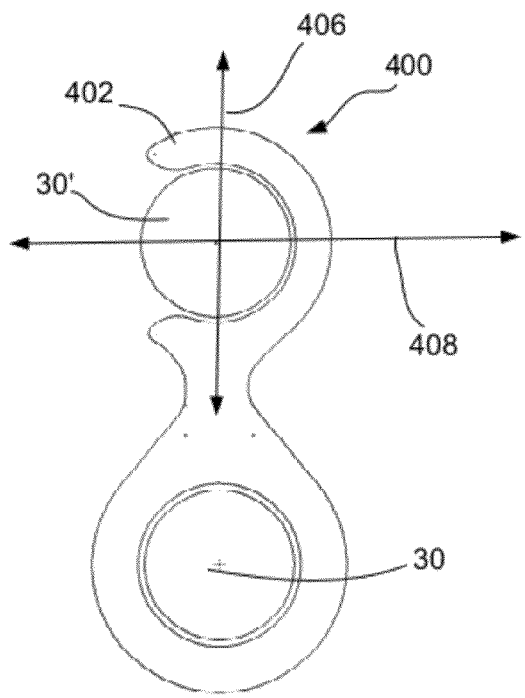
FIG. 30
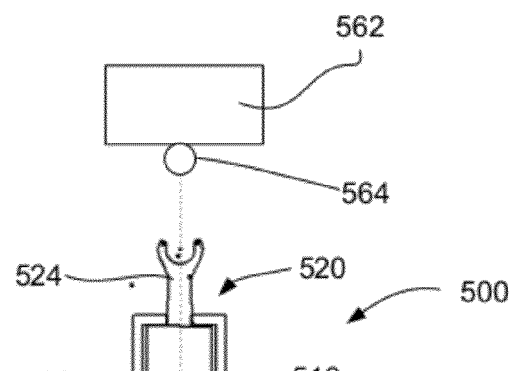
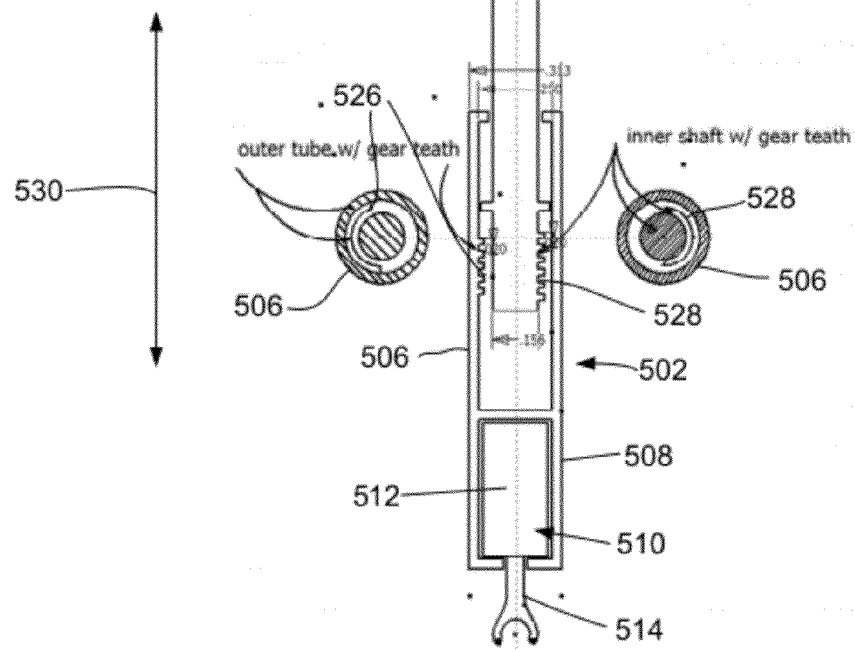
FIG. 31
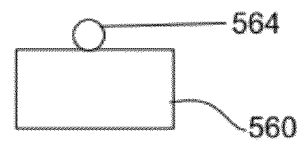

CONNECTION SYSTEM FOR MECHANICAL COMPONENTS

CROSS-REFERENCE TO RELATED APPLICATION

The present application claims the benefit of U.S. Provisional Application No. 61/452,043, filed Mar. 11, 2011, which is incorporated herein by reference.

FIELD

The present disclosure concerns embodiments of a connection system that can be used to connect mechanical components, such as toy components, components for building structures, or components of virtually any device or product that is comprised of interlocking mechanical components.

BACKGROUND

Connection systems are used in toy sets to build multi-dimensional models and structures. These systems often include components such as rods and connectors which, when connected together in a desired configuration, result in a three-dimensional structure. In some toy systems, the rods and connectors are arranged to be joined by a lateral snap-in connection in order to be able to assemble a multi-dimensional structure. The stability of the final structure in these systems depends upon the tightness of the connections formed between the various components.

SUMMARY

Disclosed herein are building components and systems which can be used to construct toys as well as buildings (such as temporary housing structures) or other mechanical devices. In some representative embodiments, a building component comprises a housing comprising at least one recess; and at least one connector assembly disposed within the at least one recess within the housing, wherein each connector assembly comprises a shaft capable of being received by the at least one recess within the housing and at least one latching mechanism disposed on the shaft and configured to form a releasable connection with another building component.

In some representative embodiments, the housing comprises a first housing portion and a second housing portion, each housing portion comprising a partially hollow inner surface which comprises the at least one recess in which the at least one connector assembly is disposed.

In some representative embodiments, the at least one latching mechanism comprises a connector arm comprising a pinned end portion capable of being secured to the shaft and an opposing free end portion of the connector arm comprising at least one projection capable of forming the releasable connection with the another building component.

In some representative embodiments, the projection is at least two projections forming deformable jaws. For example, the deformable jaws are configured with a varying angle degree relative to the A axis of the shaft including about a 45 degree angle or about a 180 degree angle relative to such axis.

In some representative embodiments, the pinned end portion of the connector arm includes an opening capable of receiving the shaft allowing the shaft to support the connector arm for pivoting movement relative to the longitudinal axis A of the shaft.

In some representative embodiments, the pinned end portion of the connector arm comprises a plurality of ridges positioned along an outer edge of the pinned end portion.

In some representative embodiments, the partially hollow inner surface in each housing portion comprises a first recess configured to receive the shaft of the at least one connector assembly and a second recess configured to receive the pinned portion of the connector arm.

In some representative embodiments, the second recess comprises a plurality of ridges for receiving the plurality of ridges on the pinned portion of the connector arm.

In some representative embodiments, the building component is a component of a toy set.

In some representative embodiments, a building component further comprises a bushing system for retaining one or more connector assemblies in place between the first and second housing portions.

In some representative embodiments, the bushing system comprises an inner main bushing formed to receive the pinned end of a connector arm and a first outer bushing and a second outer bushing each formed to receive the shaft of one or more connector assemblies.

In some representative embodiments, the inner main bushing comprises at least one recess formed to receive the pinned end of a connector arm.

In some representative embodiments, a building component further comprises one or more biasing elements disposed in each recess in the inner main bushing and configured to exert a biasing force against the one or more connector arms sufficient to prevent the connector arm to pivot freely about a pivot axis A under its own weight while allowing the one or more connector arms to be pivoted when manual pressure is applied by a user.

In some representative embodiments, a building component further comprises a pair of protrusions disposed on opposite sides of each recess in the inner main bushing wherein the pair of protrusions maintain lateral stability of each connector arm and prevent axial movement of each connector arm along the shaft.

In some representative embodiments, a system comprising at least two building components is disclosed. In some embodiments, the first building component of the system comprises a first building component housing comprising at least one recess; and at least one first building component connector assembly disposed within the at least one recess within the first building component housing, wherein each first building component connector assembly comprises a shaft capable of being received by the at least one recess within the first building component housing component and at least one latching mechanism disposed on the shaft. In some representative embodiments, the second building component of the system comprises at least one second building component connector assembly, wherein the at least one latching mechanism of the first building component connector assembly is configured to form a releasable, snap-fit connection with the second building component.

In some representative embodiments, the at least one latching mechanism comprises a connector arm comprising a pinned end portion capable of being secured to the shaft and an opposing free end portion of the connector arm comprising at least one projection capable of forming the releasable, snap-fit connection with the second building component.

In some representative embodiments, the pinned end portion of the connector arm comprises a plurality of ridges positioned along an outer edge of the pinned end portion to be received by a plurality of ridges disposed on the at least one recess of the first building component housing.

In some representative embodiments, wherein the system is a toy set.

In some representative embodiments, a method of connecting at least two building components, the method comprises providing a first building component, wherein the first building component comprises a first building component housing comprising at least one recess including a plurality of ridges; and a first building component connector assembly disposed within the at least one recess within the first building component housing, wherein each first building component connector assembly comprises a shaft and at least one connector arm comprising a pinned end portion capable of being secured to the shaft and comprising a plurality of ridges positioned along an outer edge of the pinned end portion and an opposing free end portion of the connector arm comprising at least one projection capable of forming the releasable, snap-fit connection with a second connector assembly of a second building component. In some representative embodiments, the method further comprises applying pressure to the first building component connector assembly with the second connector assembly of the second building component thereby causing the plurality of ridges disposed on the recess on the first building component to deform sufficiently to allow the connector assembly of the first building component to rotate and the at least one projection of the connector arm of the first connector assembly to snap-fit connect with the second connector assembly of the second building component.

BRIEF DESCRIPTION OF THE DRAWINGS

FIG. 5 is a side elevation view of a connector arm of the connector assembly shown in FIG. 4.

FIG. 6 is a perspective view showing the connector arm pivotably supported on a shaft at one end and forming a snap-fit connection with a shaft of another building component at its opposite end.

FIG. 7 is a side elevation view of the connector assembly of FIG. 4.

FIG. 8 is a perspective view of the connector assembly of FIG. 4.

FIGS. 17, 18, and 19 are front elevation, side elevation, and end elevation views, respectively, of a building component, according to another embodiment.

FIG. 30 is an elevation view of a connector arm, according to another embodiment.

FIG. 31 is a cross-sectional view of a building component according to another embodiment.

DETAILED DESCRIPTION

Figure 1:
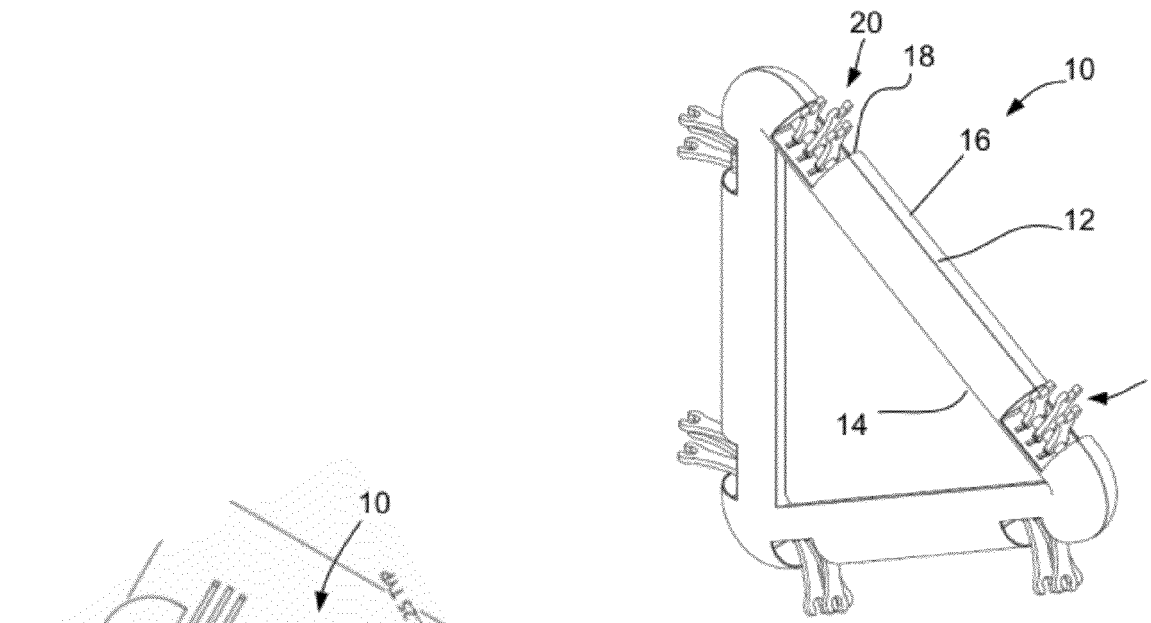
FIG. 1 is a perspective view of a building component, according to one embodiment.
Figure 2:
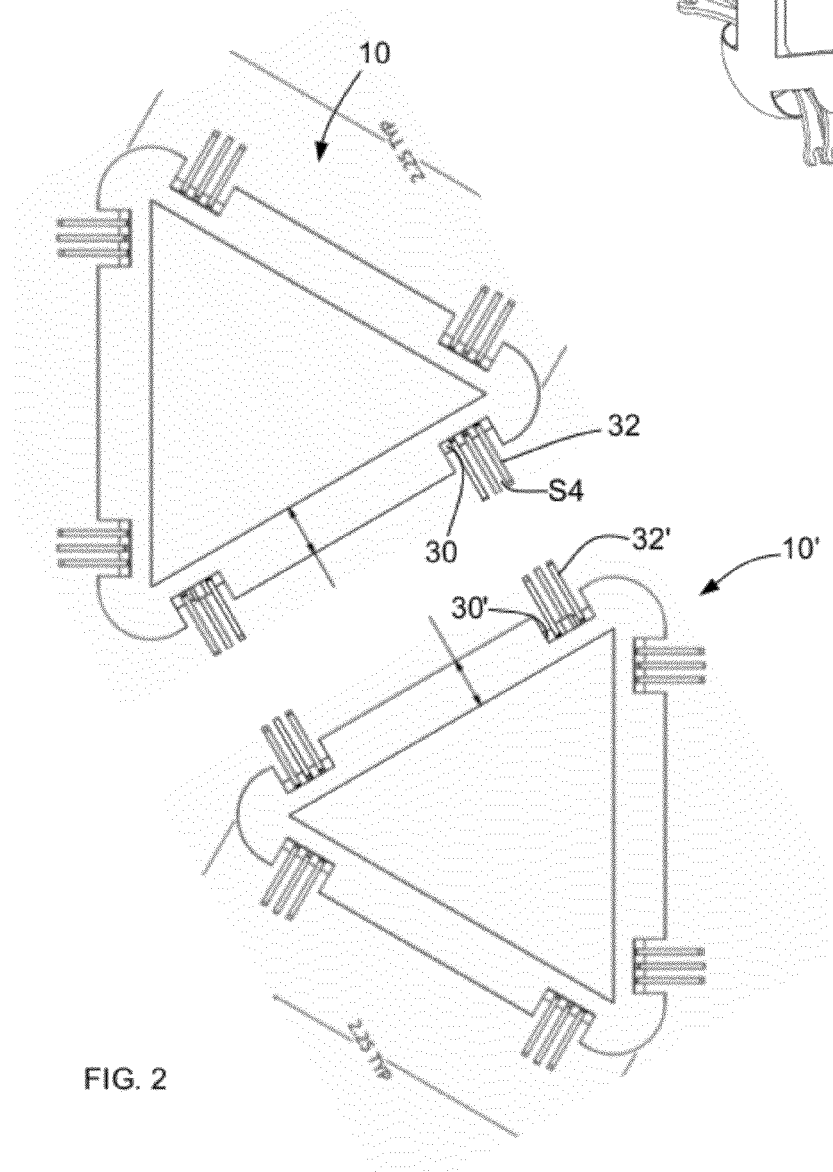
FIG. 2 is a top plan view showing how two identical building components of the type shown in FIG. 1 can be connected to each other.
Figure 3:
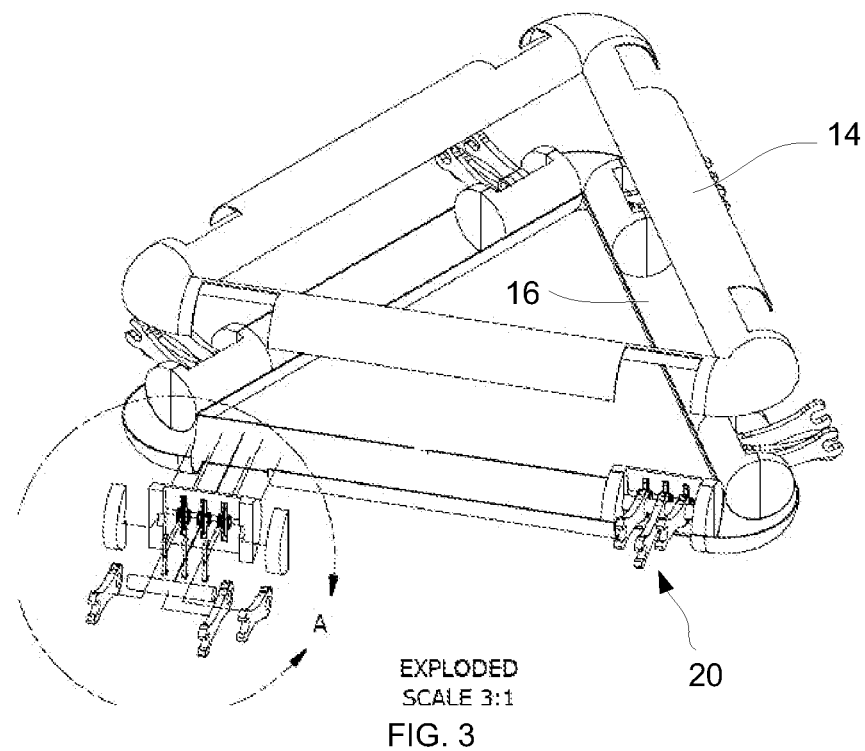
FIG. 3 is a perspective, exploded view of the building component of FIG. 1.

FIGS. 1-3 show a building component 10, according to one embodiment, that incorporates a connection system for interlocking multiple components 10 to each other or to other building components that have a compatible connection system. In the illustrated embodiment, the building component 10 is a component of a toy set, but could also be a larger component for building a structure, such as a temporary housing structure. Also, the term "building component" as used herein is not necessarily a component of a building, but instead is used generally to refer to a mechanical component used for building or assembling any type of apparatus or product. Building components disclosed herein can be used to construct, for example, temporary housing structures, toy structures, and other mechanical devices.

The building component 10 in the illustrated configuration includes a main housing 12 that can be formed from first and second housing portions 14, 16, respectively. Each side of the housing 12 can be a generally tubular or cylindrical structure that can be formed with one or more recessed portions 18 and one or more corresponding connector assemblies 20 disposed in respective recessed portions. Each connector assembly 20 is configured to form a releasable connection with a connector assembly 20 of another building component.

Figure 24:
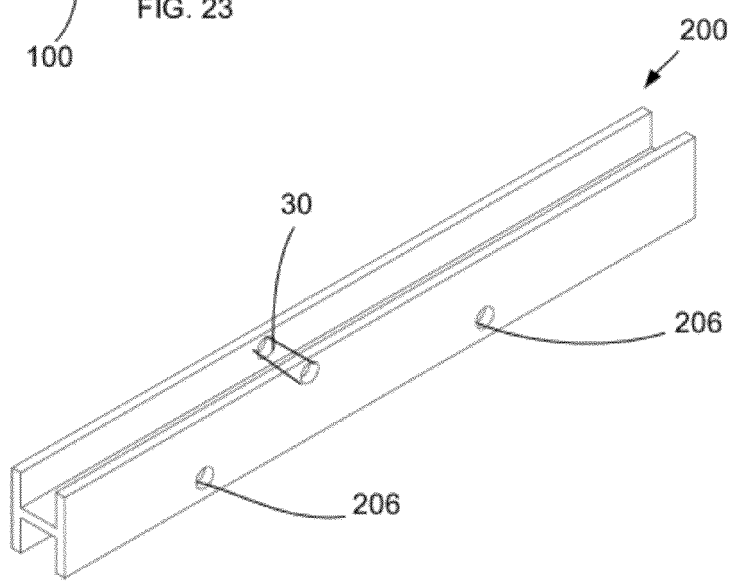
FIGS. 24 and 25 are perspective and end elevation views of a frame member, according to another embodiment.
Figure 25:
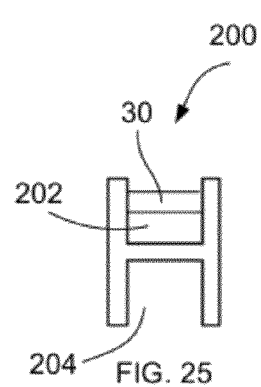
Figure 26:
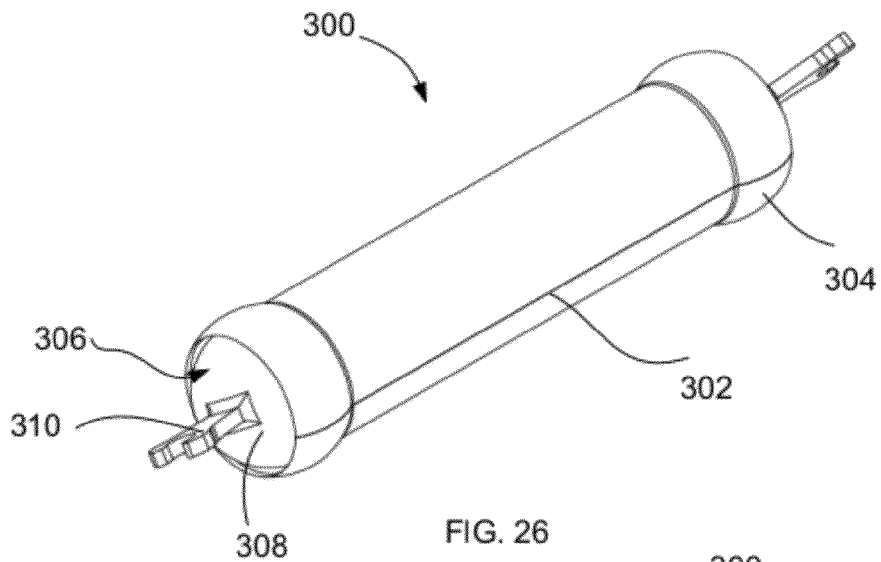
FIGS. 26, 27, and 28 are perspective, side elevation, and end elevation views of a building component, according to another embodiment.
Figure 27:
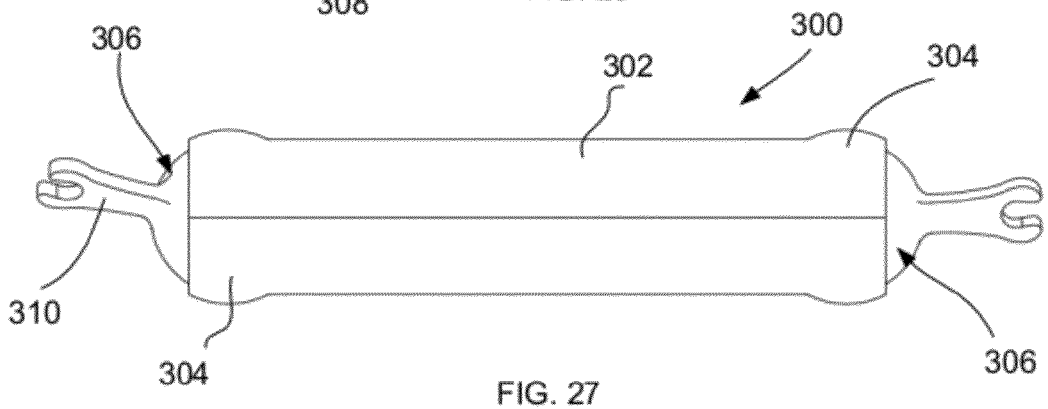
Figure 28:
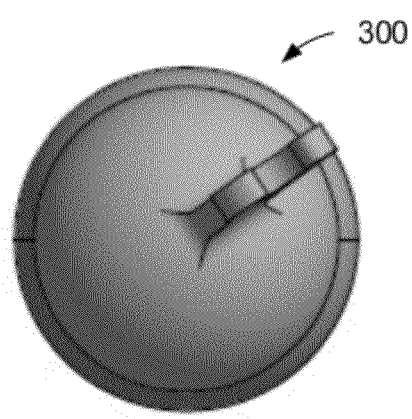
Figure 29:
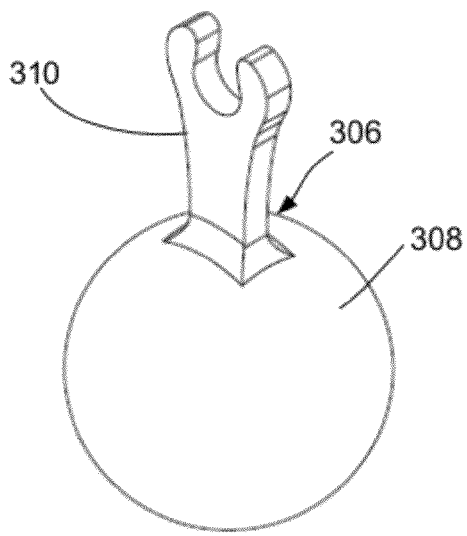
FIG. 29 is a perspective view of one of the connector portions of the building component shown in FIGS. 26-28.

In the embodiment of FIGS. 1-3, the housing 12 has a triangular shape as viewed from a top or bottom plan view. In alternative embodiments, the housing can have any of various other shapes, such as a rectangle (as shown in FIGS. 17-19), a square, a circle, an oval, a trapezoid, etc. Also, the housing 12 in the illustrated embodiment has a circular cross-sectional profile perpendicular to an axis extending parallel to the length of each side of the housing. In other embodiments, the housing can have other cross-sectional profiles, such as an H-shaped cross-sectional profile (as shown in FIGS. 24-25), a U-shaped cross-sectional profile, a triangular cross-sectional profile, etc.

Figure 4:
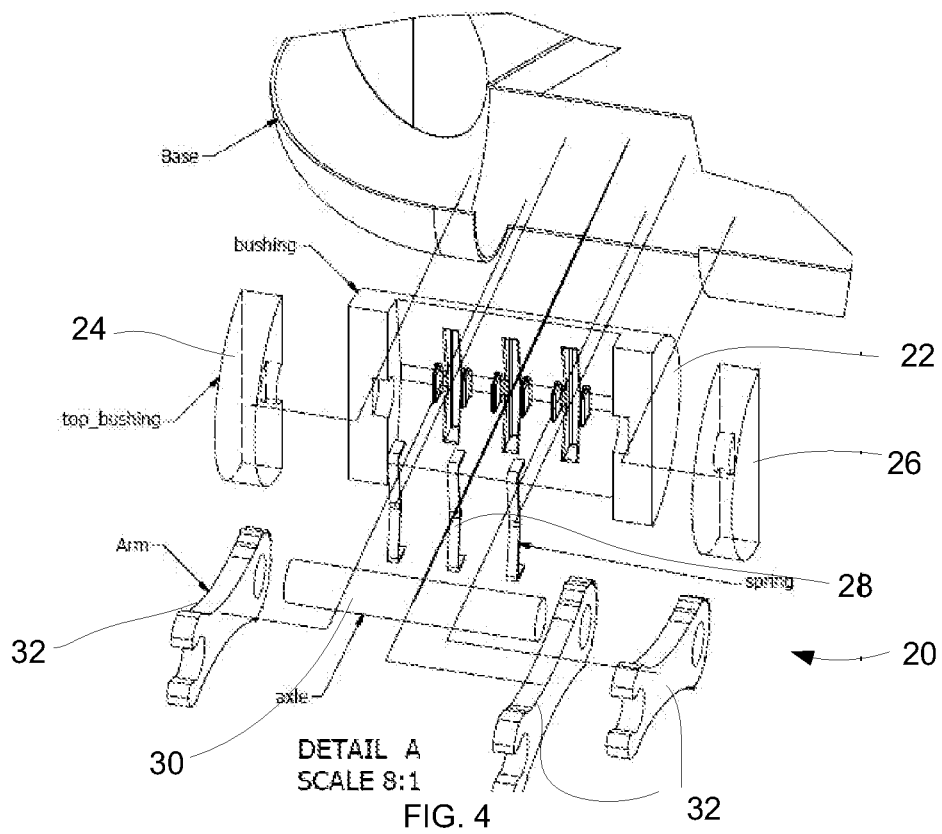
FIG. 4 is an enlarged, perspective exploded view of one of the connector assemblies of the building component shown in FIG. 3.

As best shown in FIG. 4, the connector assembly 20 in the illustrated embodiment comprises an inner main bushing 22, first and second outer bushings 24, 26, respectively, one or more biasing elements 28 disposed in the main bushing, a shaft, or axle, 30 supported between the main bushing 22 and the first and second outer bushings 24, 26, and one or more connector arms 32 supported on the shaft 30. In the embodiment shown, each side of the building component is provided with two connector assemblies and each connector assembly is provided with three connector arms. In alternative embodiments, each side of the building component can be provided with a greater or fewer number of connector assemblies 20 (or no connector assemblies) and each connector assembly 20 can have a greater or fewer number of connector arms 32 (i.e., one or more connector arms 32). The bushings 22, 24, 26 are sized and shaped to be received in a correspondingly shaped area within the housing. Sections of the housing portions 14, 16 extend over the bushings 22, 24, 26 so as to retain the connector assembly 20 in place between the housing portions 14, 16

Figure 11:
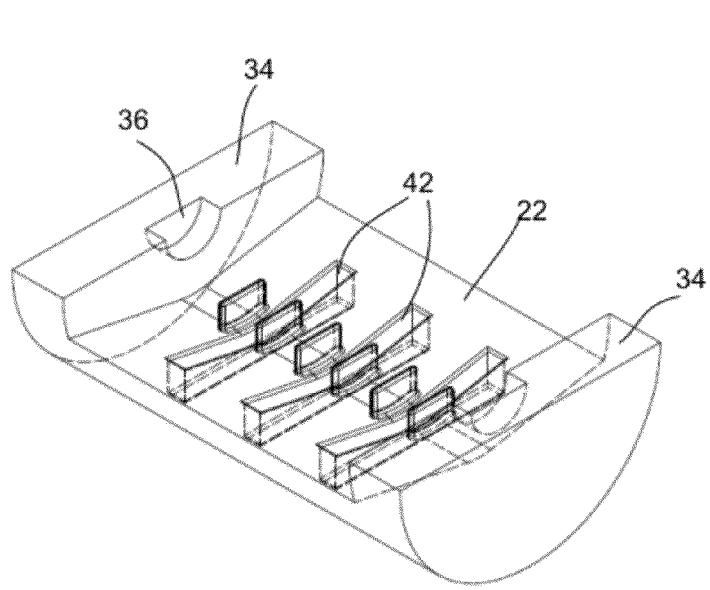
FIG. 11 is a perspective view of an inner bushing of the connector assembly of FIG. 4.
Figure 12:
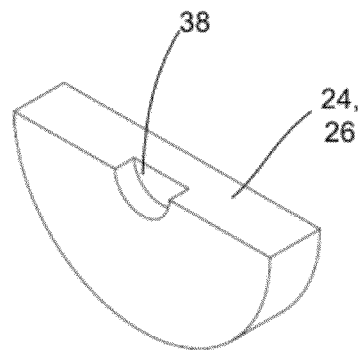
FIG. 12 is a perspective view of an outer bushing of the connector assembly of FIG. 4.
Figure 15:
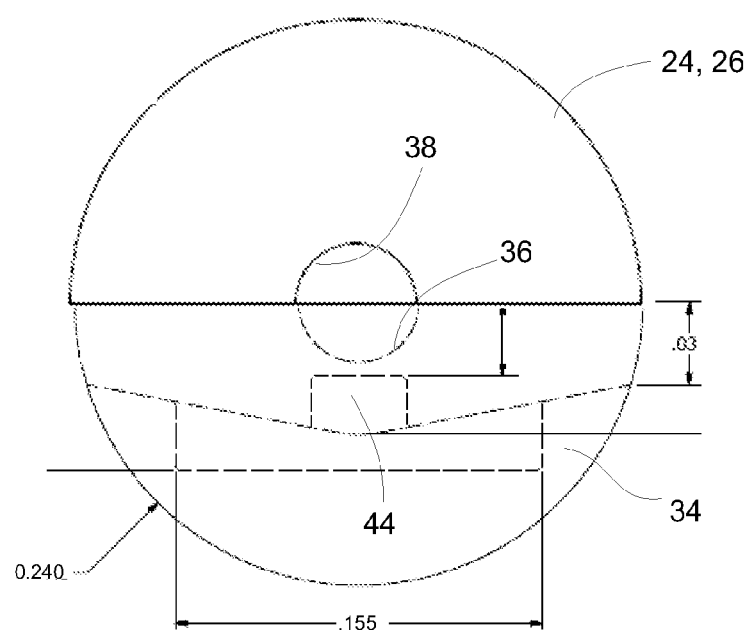
FIG. 15 is a side elevation view showing the inner bushing mating with an outer bushing in an assembled state.

As best shown in FIG. 11, the main bushing 22 can have opposing end walls 34, each formed with a notch, or recessed portion, 36 that receives an end portion of the shaft 30. Each outer bushing 24, 26 similarly is formed with a notch 38 to receive a corresponding end portion of the shaft 30 and is adapted to seat against an adjacent surface of an end wall 34 of the main bushing, as depicted in FIG. 15. In this manner, one end portion of the shaft 30 is received in the notches of one end wall 34 and a corresponding outer bushing and the other end portion of the shaft is received in the notches of the other end wall 34 and a corresponding outer bushing. The shaft 30 therefore is effectively retained between the main bushing and the two outer bushings but can rotate relative to the bushings around its longitudinal axis A (FIG. 6).

As best shown in FIGS. 5 and 6, each connector arm 32 has a pinned end portion 50 secured to the shaft 30 and an opposing free end portion 52. The shaft 30 can extend through corresponding openings in end portion 50 of each connector arm 32 to support the arms 32 for pivoting movement relative to the longitudinal axis A of the shaft. The shaft 30 desirably is sized to form a tight frictional fit with the openings in the connector arms to resist movement of the connectors relative to shaft, although various other techniques or mechanisms can be used to secure the connector arms on the shaft and prevent relative movement between shaft and the connector arms. The free end portion 52 of each connector arm is configured to form a releasable, snap-fit connection with a shaft 30' of another building component 10 (the shaft 30' can be part of an identical connector assembly 20 of another building component or can be part of a building component that does not have any components of the connector assembly 20 other than the shaft).

The free end portion 52 can comprise, for example, resiliently deformable jaws 54 that are configured to form a snap-fit connection around the shaft 30'. As used herein, a "snap-fit" arrangement or a "snap-fit" connection means a releasable connection between two bodies having opposing surfaces, which connection is formed by resiliently deforming at least one of the bodies so as to allow the opposing surfaces to be placed in an interlocking relationship with each other.

For example, to connect the connector arm 32 to the shaft 30', the connector arm 32 is urged against the shaft in a direction perpendicular to the pivot axis A, as indicated by arrow P2, with sufficient force to cause the jaws 54 to spread apart and allow the shaft 30' to pass the distal ends 58 of the jaws and move into a relatively larger receiving space 56 between the jaws. The minimum spacing S1 between the opposing distal ends 58 of the jaws 54 is smaller than the outer diameter of the shaft 30'. The receiving space 56 has a maximum diameter or width S2 that is greater than S1 and desirably greater than the outer diameter of the shaft 30'. Thus, once the shaft 30' is urged into the space 56 between the jaws 54, the jaws can spring back to their original position and prevent separation of the shaft 30' from the jaws 54 until a sufficient separation force is applied to a direction opposite of the direction P2.

Figure 13:
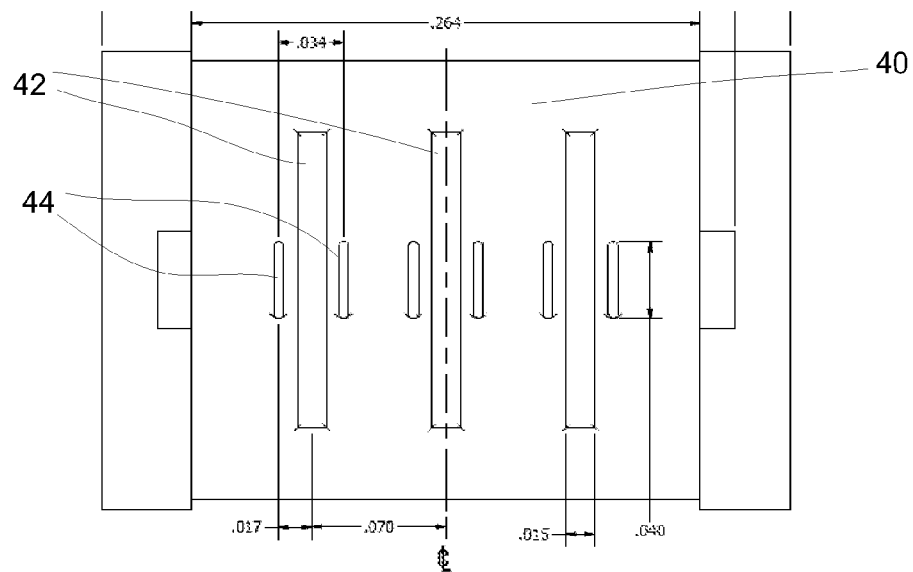
FIGS. 13 and 14 are top plan and front elevation views, respectively, of the inner bushing shown in FIG. 11.
Figure 14:
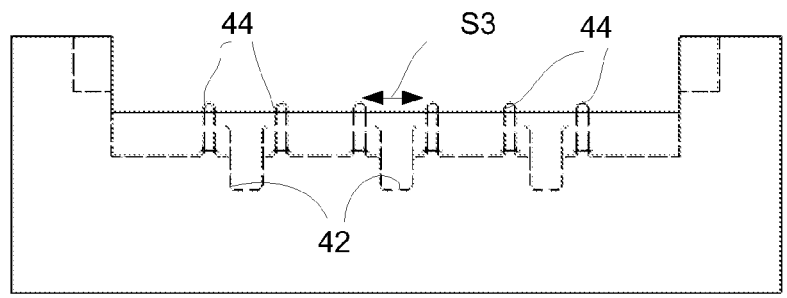

Referring now to FIGS. 13 and 14, the main bushing can have an inner surface 40 formed with one or more recessed portions 42, each configured to receive one of the biasing elements 28. On opposite sides of each recessed portion 42 are protrusions 44. The spacing S3 between each protrusion 44 can be about equal to or slightly greater than the thickness of a connector arm placed between the protrusion. In this manner, a pair of protrusions 44 can help maintain lateral stability of a connector arm 32 and can prevent axial movement of the connector arm along the shaft.

Figure 9:
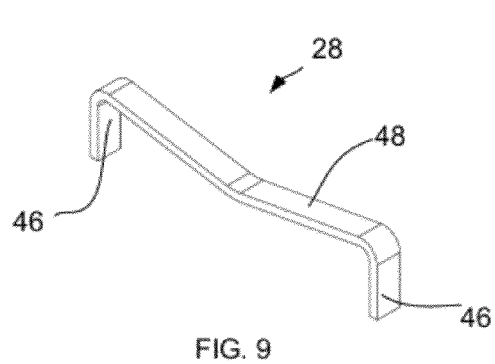
FIGS. 9 and 10 are perspective and side elevation views, respectively, of a spring that can be used in the connector assembly shown in FIG. 4.
Figure 10:
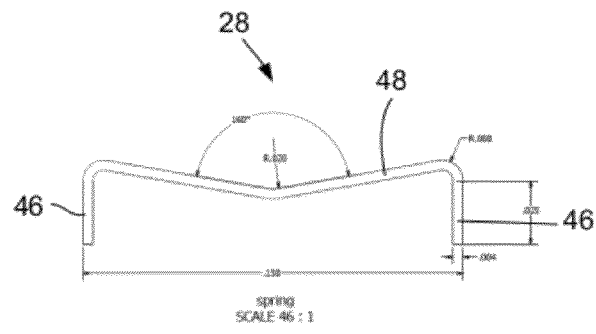

As best shown in FIGS. 9 and 10, the biasing element can be in the form of a metal spring comprising opposing leg portions 46 and an elongated beam 48 extending from the upper end of one leg portion 46 to the upper end of the other leg portion 46. The beam 48 can have an inwardly bent, generally V-shaped configuration that slopes downwardly from each end to a center point of the beam. As best shown in FIG. 8, the leg portions 46 of a biasing element are disposed in a recessed portion 42 of the main bushing such that the beam 48 can bear against an adjacent end surface 60 of a connector arm 32. The end surface 60 of the connector arm can be formed with a plurality of spaced-apart ridges 62 that can contact the beam 48.

The biasing element 28 is configured to exert a biasing force against the connector arm 32 sufficient to prevent the connector arm to pivot freely about a pivot axis A under its own weight, yet allows the connector arm to be easily pivoted when manual pressure is applied by a user. The ridges 62 cooperate with the adjacent surface of the beam 48 to provide tactile feedback to a user regarding the angular position of the connector arm relative to the main bushing 22.

Referring again to FIG. 2, where a connector assembly 20 includes multiple connector arms 32, as in the illustrated embodiment, the connector arms desirably are spaced apart from each other along the shaft a distance S4 that is sufficient to allow the connector arms of another building component to fit within the spacing. For example, to connect a building component 10 to an identical building component 10', connector arms 32' of component 10' can be inserted between connector arms 32 of component 10 and the two components can be urged together to cause connector arms 32' to form a snap-fit connection with shaft 30 and connector arms 32 to form a snap-fit connection with shaft 30'.

Figure 16:
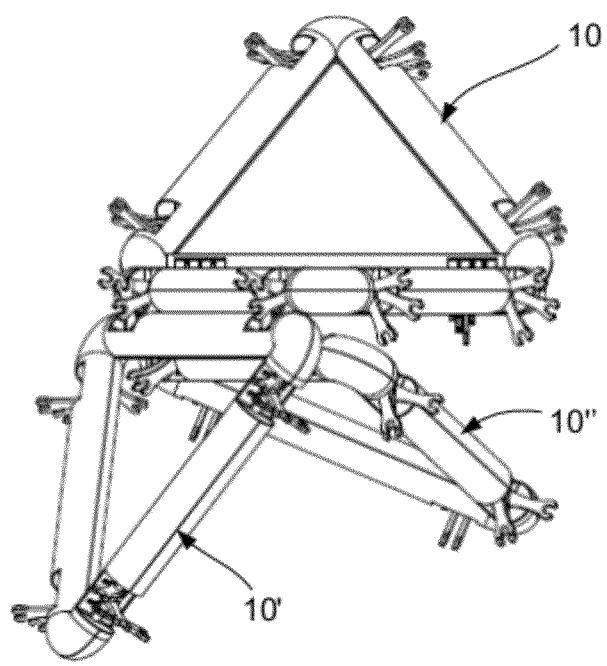
FIG. 16 is a perspective view of an assembly formed from interconnecting three identical building components of the type shown in FIG. 1.

FIG. 16 is one example of an assembly that can be formed from multiple building components. This assembly includes a first building component 10 secured to a second building component 10', which in turn is secured to a third building component 10". It can be appreciated that any number of building components can be added to the assembly. In addition, each building component can be positioned at any one of a plurality of angular positions relative to an adjacent building component due to the pivoting action of the connector arms 32.

Figure 20:
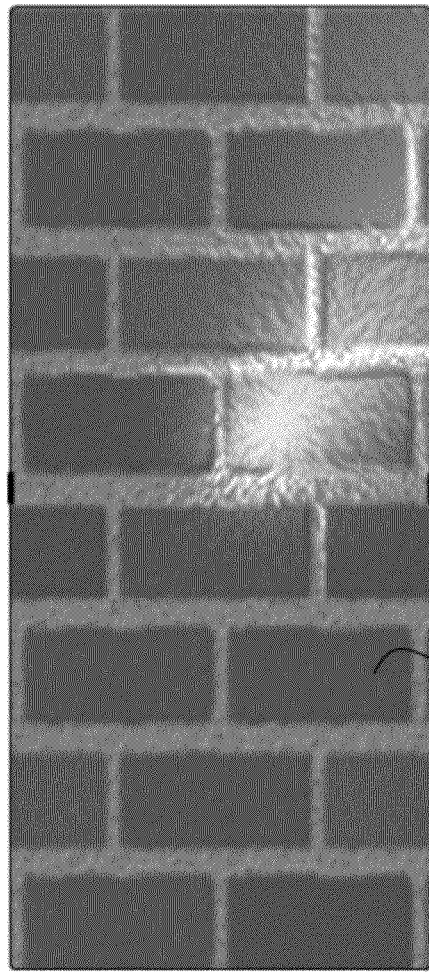
FIGS. 20, 21, and 22 are front elevation, side elevation, and end elevation views, respectively, of the panel member removed from the building component shown in FIGS. 17-19.
Figure 21:
Figure 22:
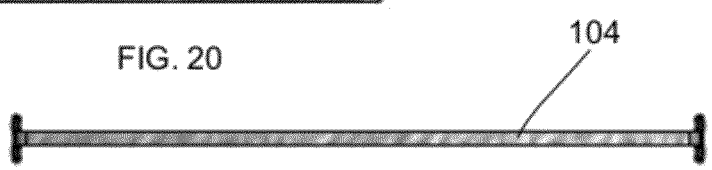

FIGS. 17-19 show a building component 100, according to another embodiment. The building component 100 has a rectangular frame 102 that supports a panel member 104 within the interior space defined by the frame 102 Like the embodiment shown in FIGS. 1-3, each side of the frame 102 is formed from a tubular frame component that serves as a housing for housing one or more connector assemblies 106. Each connector assembly 106 in the illustrated embodiment has one connector arm 108, although multiple connector arms 108 per assembly 106 can be used. The construction of each connector assembly 106 can be identical to the construction of the connection assembly 20 described above in connection with the building component 10. FIGS. 20-22 show the panel member 104 removed from the frame 102. The panel member 104 can be adapted to be secured within the frame via a frictional fit that allows a user to easily remove the panel member from the frame and replace it with another panel member.

In certain embodiments, a set of components can include a plurality of identically shaped panel members, each having different surface ornamentation. The frame can be configured to receive any one of the panel members of the set. In other embodiments, the panel member 104 can be permanently secured to the frame 102.

Figure 23:
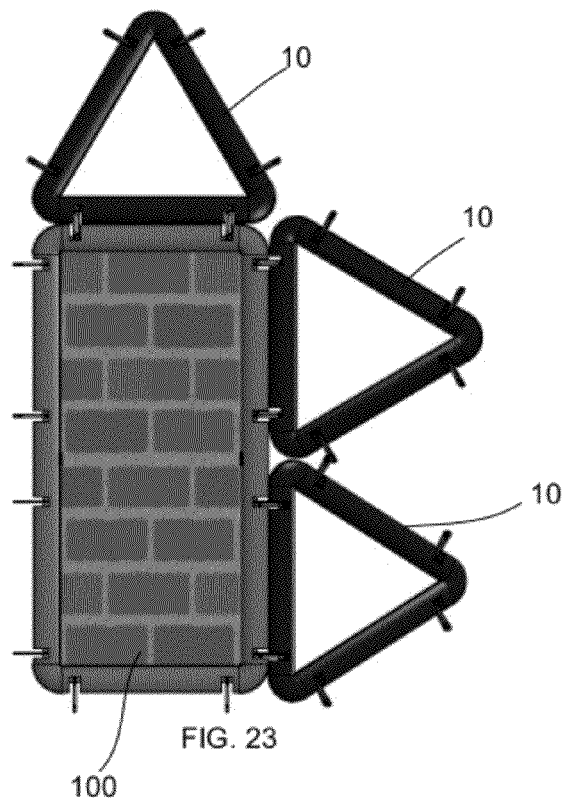
FIG. 23 is an elevation view of an assembly formed from a building component of the type shown in FIG. 17 and three building components of the type shown in FIG. 1.

FIG. 23 shows an example of an assembly formed from a building component 100 and three building components 10 connected to the building component 100. In this embodiment, each connector assembly of building component 100 has one connector arm 32.

FIGS. 24-25 illustrate a frame member 200, according to another embodiment, that can be used to mount one or more connector assemblies (e.g., one or more connector assemblies 20). The frame member 200 has an H-shaped cross-sectional profile perpendicular to its length, defining first and second receiving spaces 202, 204, respectively, for receiving one or more connector assemblies. For example, the sidewalls of the frame member can be formed with pairs of opposing apertures 206 at selected locations along the length of the frame members. A connector assembly can be mounted to the frame member 200 by mounting the opposing ends of a shaft 30 within a pair of apertures 206. The shaft can support one or more connector arms 32. Thus, in this embodiment, the shaft need not be supported by bushings 22, 24, 26.

FIGS. 26-29 illustrate a building component 300, according to another embodiment. The building component 300 includes an elongated, generally cylindrical housing 302. The housing 302 can have enlarged end portions 304 that contain respective connector portions 306. Each connector portion 306 includes a spherical ball 308 disposed in an end portion 304 and an outwardly extending connector arm 310. The end portions 304 of the housing are curved to match the curvature of the balls 308. Each end portion 304 and a corresponding ball 308 therefore form a ball and socket joint that allows pivoting movement of the connector portion 306 in any direction relative to the housing 302. The connector arm 310 functions in the same manner as connector arm 32 and connector arm 108; that is, the building component 300 can be secured to another building component having a shaft sized to be received in the jaws of the connector arm 310 by snap fitting the connector arm to the shaft.

FIG. 30 shows a connector arm 400, according to another embodiment. The connector arm 400 can be mounted on a shaft 30, like the connector arm 32 described above in connection with FIGS. 1-8. In contrast to the connector arm 32, the distal end portion of the connector arm 400 comprises a hook 402 that receives and forms a snap-fit connection with a shaft 30' of another building component. As depicted in FIG. 30, separation forces acting on two building components interconnected by the connector arm 400 typically will extend in a direction parallel to the length, or longitudinal axis, of the connector arm, as indicated by arrow 406. The opening of the hook 402 is rotationally offset from the longitudinal axis of the connector arm and the direction of separation forces acting along the longitudinal axis. In order to connect or remove the hook from the shaft 30', the hook must be moved in a direction 408 that intersects the direction 406 of separation forces acting along the length of the connector arm. In this manner, the hook 402 is better able to resist separation forces acting along the length of the connector arm.

The connector arm 400 can be implemented in any of the embodiments disclosed herein. For example, in one implementation, connector assembly 20 described above can be modified to include one or more connector arms 400 instead of connector arms 32. In another implementation, connector arm 310 (FIGS. 26-29) can be modified to include a hook 402.

FIG. 31 shows a building component 500, according to another embodiment. The building component 500 can be used to interconnect two other building components and can be placed in tension or compression to enhance the connection between the two other building components, as further described below. The building component 500 generally comprises a main cylinder portion 502 and a main shaft portion 504 partially received in the cylinder portion 502.

The cylinder portion 502 comprises a first cylinder section 506 and a second cylinder section 508. A first connector portion 510 has a base 512 disposed in the second cylinder section 508 and a connector arm 514 extending outwardly from the base 512. The shaft portion 504 includes a shaft 516 that extends into the first cylinder section 506 and a cylinder section 518 at the outer end of the shaft 516. A second connector portion 520 comprises a base 522 disposed in the cylinder section 518 and a connector arm 524 extending outwardly from the base. The bases 512, 522 can be cylindrical bodies that are sized and shaped to rotate within cylinder section 508, 518, respectively, relative to the cylinder portion 502 and the shaft portion 504 about the longitudinal axis of the building component. The connector arms 514, 524 are configured to form a snap-fit connection with respective shafts of other building components, as previously described.

A portion of the inner surface of the cylinder section 506 is formed with internal threads or gear teeth 526 that extend less than 180 degrees along the inner surface. The internal gear teeth 526 can extend partially along the length of the cylinder section 506 or along substantially the entire length of the cylinder section 506. Likewise, a portion of the outer surface of the shaft 516 is formed with external threads or gear teeth 528 that extend less than 180 degrees around the outer surface of the shaft. The external gear teeth 528 can extend partially along the length of the main shaft or along substantially the entire length of the shaft. The gear teeth 526, 528 desirably comprise square gear teeth as shown.

Because the gear teeth 526, 528 extend less than 180 degrees around their respective rotational axes, the shaft 516 can be rotated to a position relative to the cylinder section 506 in which the internal gear teeth 526 are not engaged with the external gear teeth 528. In this position, the shaft portion 504 can slide freely relative to the cylinder portion 502 in the directions indicated by arrow 530 to increase or decrease the overall length of the building component 500. When the main shaft 516 is rotated to a position in which the internal gear teeth 526 are engaged or mesh with the external gear teeth 528, the engagement of the teeth 526, 528 prevents translation (sliding movement) of the shaft portion 504 relative to the cylinder portion 502, although the overall length of the building component can be slightly increased or decreased by rotating the shaft portion 504 and the cylinder portion 502 relative to each other.

The building component 500 can be used to interconnect two other building components 560, 562 that have connectors compatible with connector arms 514, 524. For example, the two other building components 560, 562 can have respective shafts 564 that form snap fit connections with connector arms 514, 524. In use, the building component 500 is placed between the two spaced apart building components 560, 562 and the connector arm 514 can be secured to the shaft 564 of the building component 560. The main shaft portion 504 is then extended relative to the main cylinder portion 502 far enough to connect the connector arm 524 to the shaft 564 of the building component 562. As noted above, the main shaft portion can be translated axially relative to the main cylinder portion when the main shaft portion is positioned rotationally relative to the main cylinder portion such that the gear teeth 526, 528 are not engaged with each other.

Once the connector arm 524 is secured to the shaft 564 of the building component 562, the main shaft portion 504 is rotated relative to the main cylinder portion 502 to cause the gear teeth 526, 528 to engage each other. Further rotation of the main shaft portion relative to the main cylinder portion in a direction that causes the length of the building component 500 to increase will place the building component 500 in compression between the building components 560, 562 (assuming the positions of components 560, 562 are fixed). Alternatively, once the connector arm 524 is secured to the shaft 564 of the building component 562 and the connector arm 514 is secured to the shaft 564 of the building component 560, the main shaft portion can be rotated relative to the main cylinder portion in a direction that causes the length of the building component 500 to decrease, which will place the building component 500 in tension between the building components 560, 562.

Figure 32:
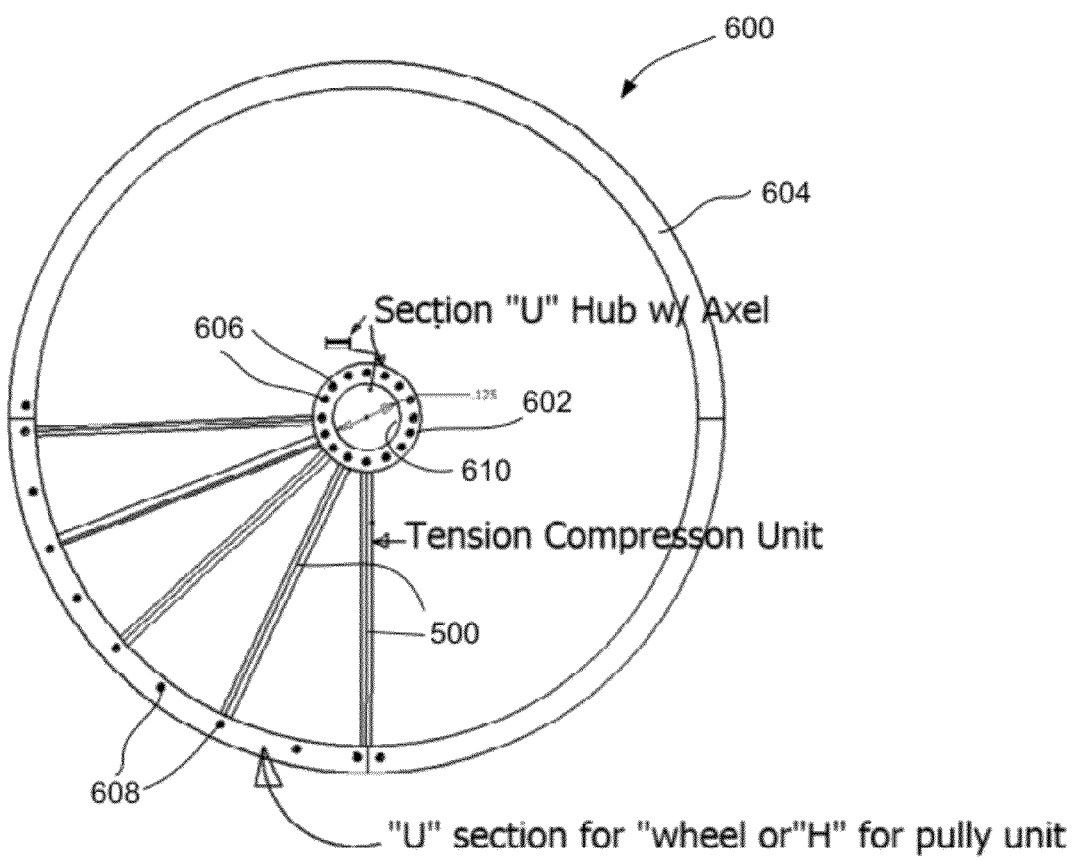
FIG. 32 is a side elevation view of a wheel assembly constructed from building components of the type shown in FIG. 31.
Figure 33:
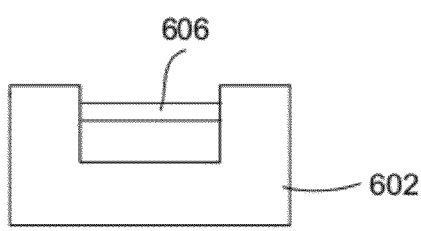
FIG. 33 is a cross-sectional view of the inner frame member of the wheel assembly of FIG. 32.
Figure 34:
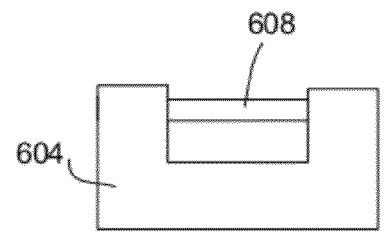
FIG. 34 is a cross-sectional view of the outer frame member of the wheel assembly of FIG. 32.

FIGS. 32-34 illustrate a wheel assembly 600. FIG. 32 is a side view of a wheel assembly 600 that is comprised of an inner frame member, or hub, 602, an outer frame member, or rim, 604, and a plurality of components 500 that serve as spokes interconnecting the inner and outer frame members. The inner frame member 602 includes a plurality of circumferentially spaced pins, or shafts, 606. The outer frame member 604 likewise includes a plurality of circumferentially spaced pins, or shafts, 608. Each spoke 500 includes connector arms 514 and 524 (not shown) at its opposite ends connected to a pin 606 on the inner frame member 602 and a pin 608 on the outer frame member 604. The wheel assembly 600 can be used in any of various applications. For example, the wheel assembly 600 can be used as a wheel of a vehicle or as a pulley. In such applications, the wheel assembly 600 can be supported on a shaft that extends through the central opening 610 of the inner frame member 602.

FIGS. 35-38 show a building component 700, according to one embodiment, that incorporates a connection system for interlocking multiple components 700 to each other or to other building components that have a compatible connection system. In the illustrated embodiment, the building component 700 is a component of a toy set but could also be a larger component for building a structure, such as a temporary housing structure.

The building component 700 in the illustrated configuration includes a main housing 712 that can be formed from first and second housing portions 714, 716, respectively. Each side of the housing 712 can be a generally tubular or cylindrical structure that can be partially hollow and include a recess capable of receiving a connector assembly 720. In some embodiments, the first housing portion 714 and the second housing portion 716 can be aligned and snap-fitted together to form the main housing 712. Each connector assembly 720 is configured to form a releasable connection with another building component, such as another connector assembly 720 of another building component.

In the embodiment of FIGS. 35-38, the housing 712 has a triangular shape as viewed from a top or bottom plan view. As provided in FIG. 35, the housing 712 is a right triangle as viewed from a top or bottom plan view including one 90 degree angle and two 45 degree angles. As provided in FIG. 36, the housing 712 is a triangular shape as viewed from a top or bottom plan view including three 60 degree angles. In alternative embodiments, the housing can have any of various other shapes, such as a rectangle, a square, a circle, an oval, a trapezoid, etc. Also, the housing 712 in the illustrated embodiment has a circular cross-sectional profile perpendicular to an axis extending parallel to the length of each side of the housing. In other embodiments, the housing can have other cross-sectional profiles, such as an H-shaped cross-sectional profile, a U-shaped cross-sectional profile, a triangular cross-sectional profile, etc.

Figure 35:
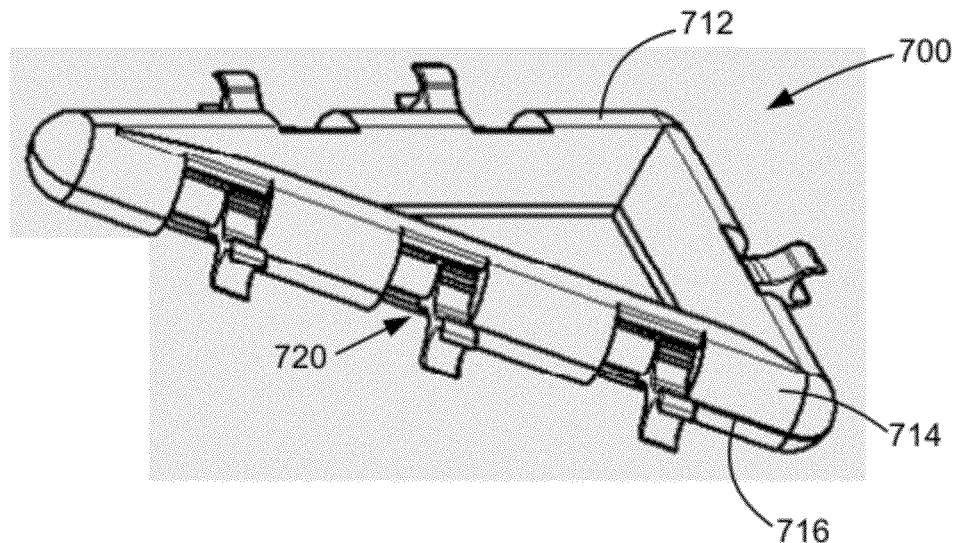
FIG. 35 is a perspective view of a building component, according to another embodiment.
Figure 36:
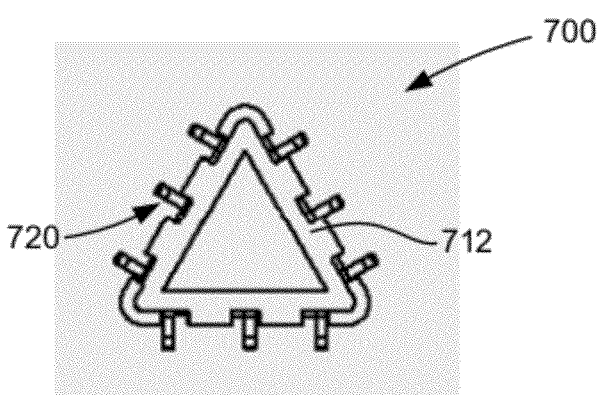
FIG. 36 is a top plan view of the building component of FIG. 35.

In the embodiment shown in FIGS. 35 and 36, each side of the building component includes three connector assemblies 720, each including one connector arm 732 and one shaft or axle 730. In alternative embodiments, each side of the building component can be provided with a greater or fewer number of connector assemblies 720 (or no connector assemblies) and each connector assembly 720 can have a greater or fewer number of connector arms 732 (i.e., one or more connector arms 732).

Figure 37:
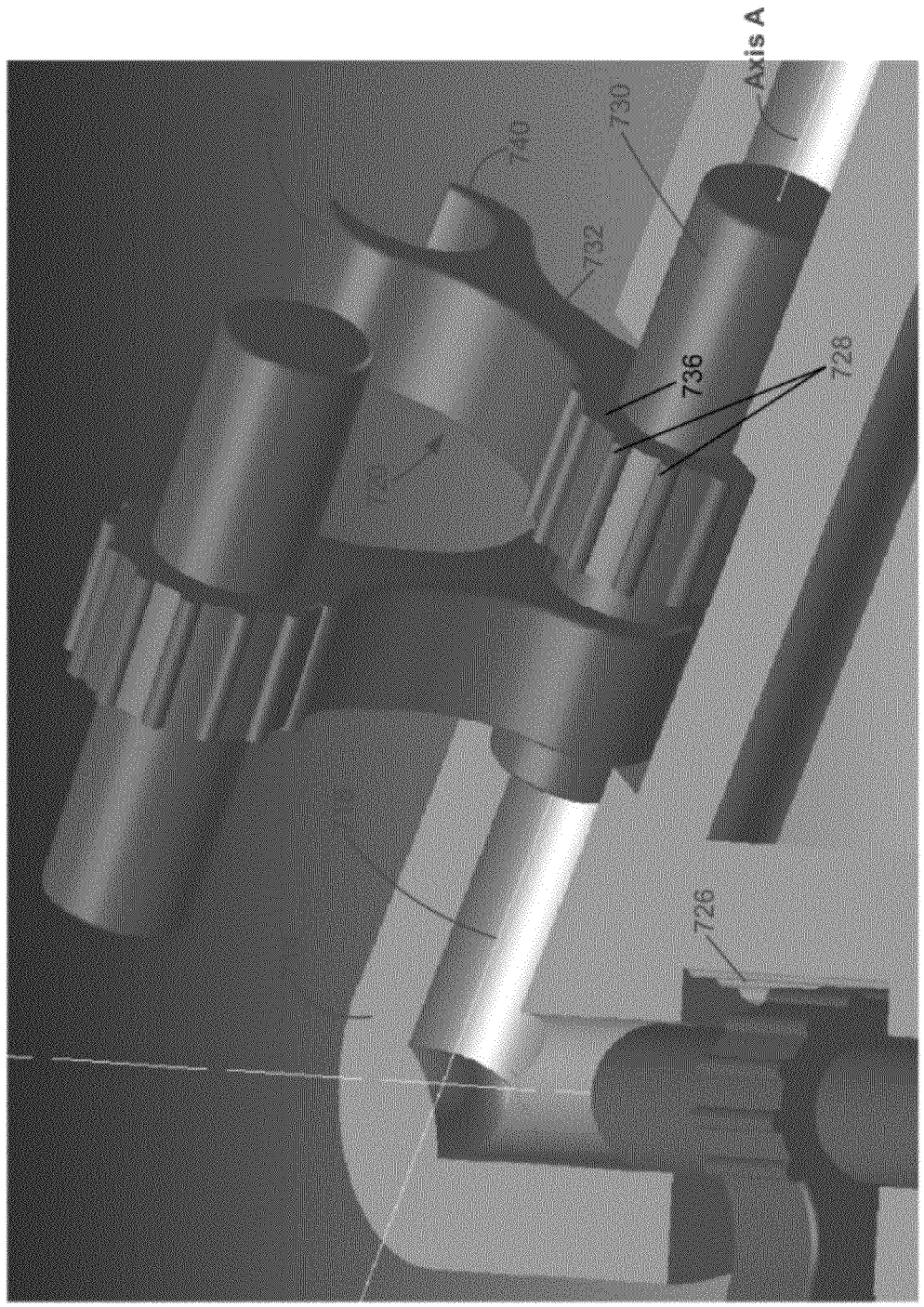
FIG. 37 is an exploded view of the building component of FIG. 35 or 36.
Figure 38:
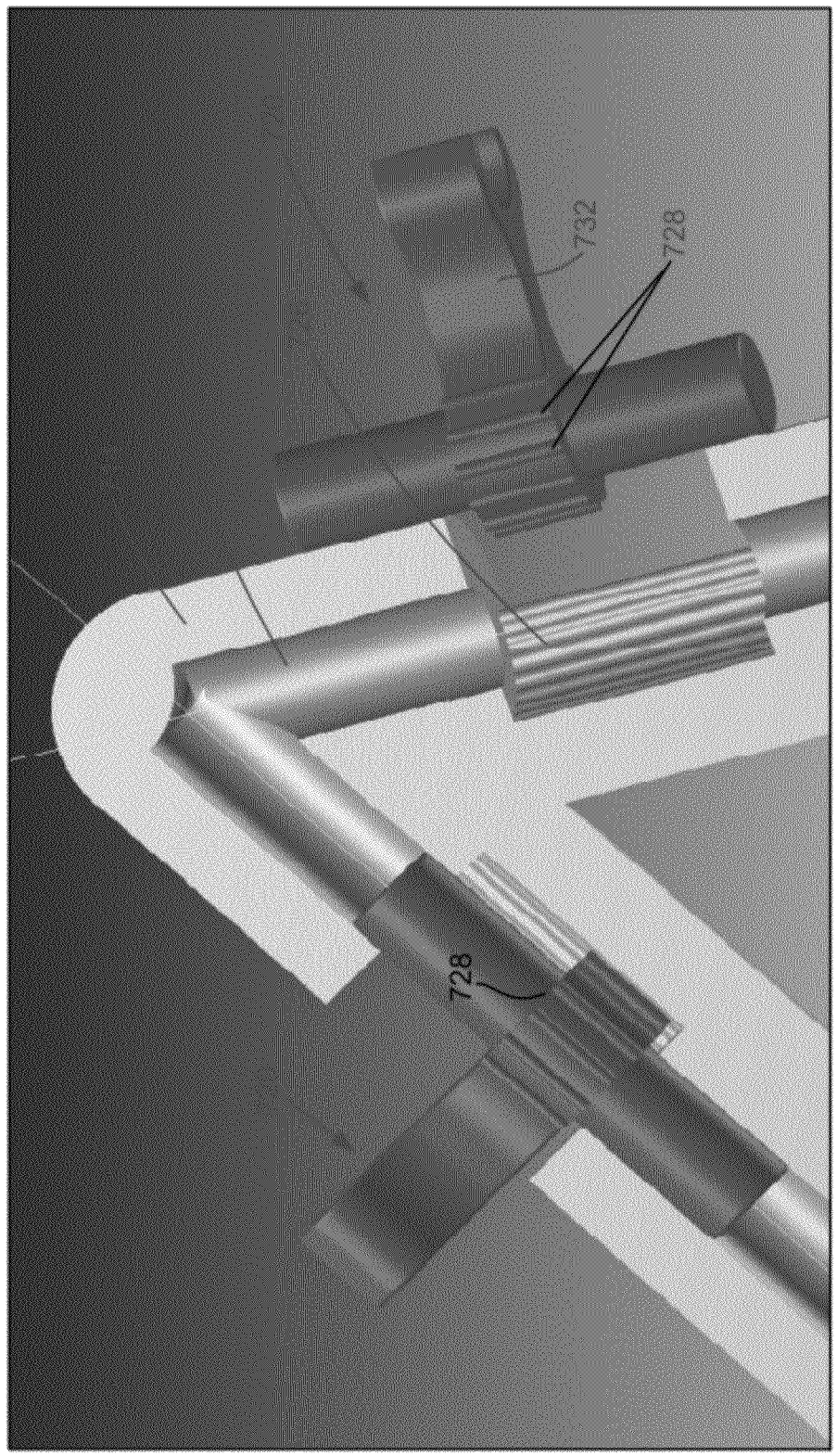
FIG. 38 is an exploded view of the building component of FIG. 35 or 36.

As best shown in FIGS. 37 and 38, the connector assembly 720 in the illustrated embodiment comprises a shaft, or axle, 730 and one or more connector arms 732 supported on the shaft 730. Each connector arm includes a pinned end portion 736 secured to the shaft 730 and an opposing free end portion 738. The shaft 730 can extend through corresponding openings in end portion 736 of each connector arm 732 to support the arms 732 for pivoting movement relative to the longitudinal axis A of the shaft. The pinned end portion 736 includes a plurality of ridges 728. The shaft 730 desirably is sized to form a tight frictional fit with the openings in the connector arms to resist movement of the connectors relative to shaft, although various other techniques or mechanisms can be used to fixedly secure the connector arms on the shaft and prevent relative movement between shaft and the connector arms. The shaft 730 is also desirably sized to fit within a main cylinder portion 718 included within a housing portion of a building component (as shown in FIGS. 37 and 38). The free end portion 738 of each connector arm 732 is configured to form a releasable, snap-fit connection with a shaft of another building component. The free end portion 738 can comprise, for example, a latch mechanism 740 that is configured to form a snap-fit connection around another building component. The latch mechanism 740 can comprise deformable jaws that extend at different angles relative to the length of the arm 732, such as a 45 degree angle (as shown in FIG. 45) or a 180 degree angle (as shown in FIGS. 37 and 44) or any other desired angle depending upon the desired relationship between the various building components.

As illustrated in FIGS. 37 and 38, the building component 700 comprises a first housing portion 714 with an inner surface including a main cylinder portion 718 for receiving a shaft or axle 730 of a connector assembly 720. A portion of the inner surface of the cylinder section 718 is further recessed and is formed with internal ridges 726 capable of engaging the ridges 728 on one or more connector assemblies 720. In use, as the connector assembly 720 turns within the main cylinder portion 718 of the housing, the ridges of the connector assembly come in contact with the ridges of the housing. Thus, contact occurs between the ridges of the connector assembly and housing which in turn causes the material of the ridges to compress or deform slightly to allow the ridges of connector assembly to pass over the ridges of the housing, then returns to the original shape when the ridges of the connector assembly are within respective spaces between the ridges on the housing; this is a characteristic of the modules of elasticity of the material used to construct the ridges and latch as well as the physical dimensions and shape of the ridges. The configuration of the ridges on the arm 732 and within the housing functions as an indexing mechanism that applies enough pressure to the arm 732 to retain it at a selected angle relative to the housing when connecting the arm to the shaft of another connector assembly. The ridges 726, 728 desirably comprise rounded edges as shown.

Figure 39:
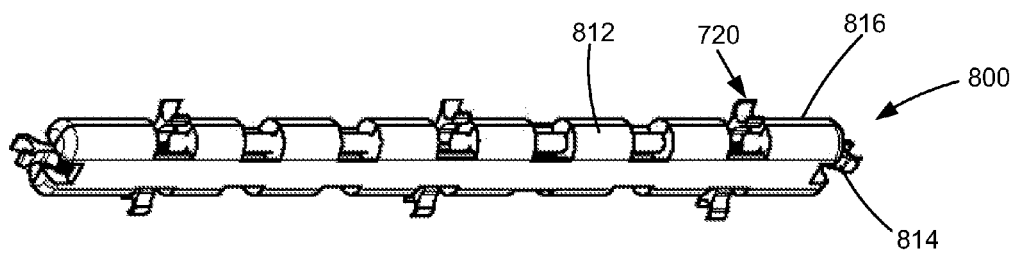
FIG. 39 is a perspective view of a building component, according to another embodiment.
Figures 40, 41:
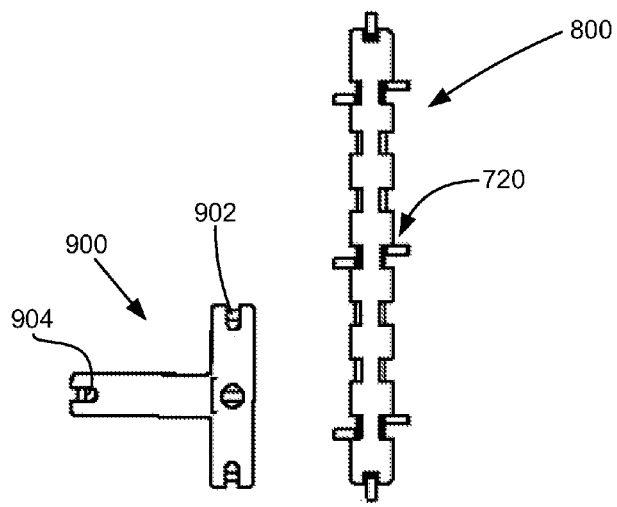
FIG. 40 is a top plan view of a building component of FIG. 39.
FIG. 41 is a top plan view of a building component in a t-shape, according to another embodiment.
Figure 44:
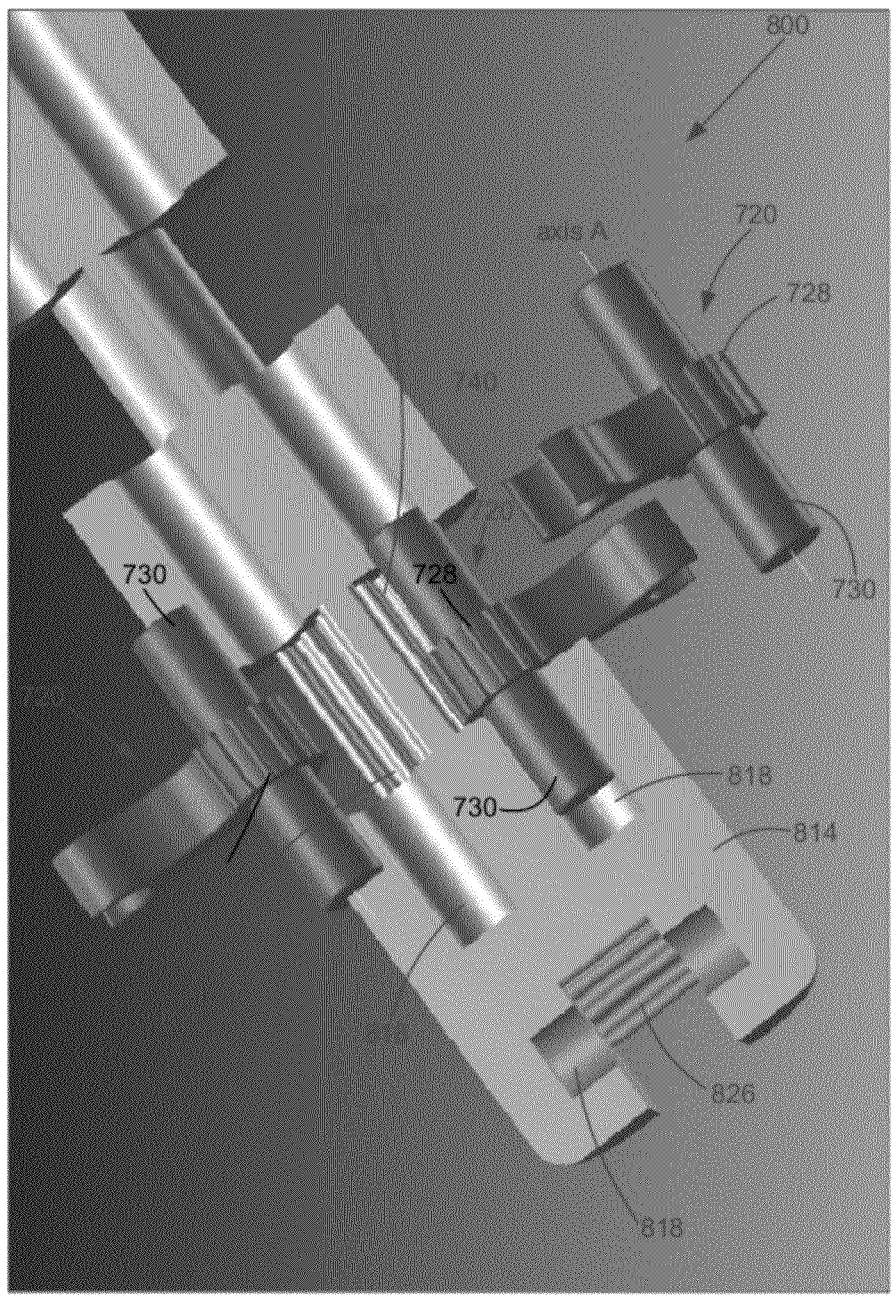
FIG. 44 is an exploded, partial view of a building component, according to another embodiment.
Figure 45:
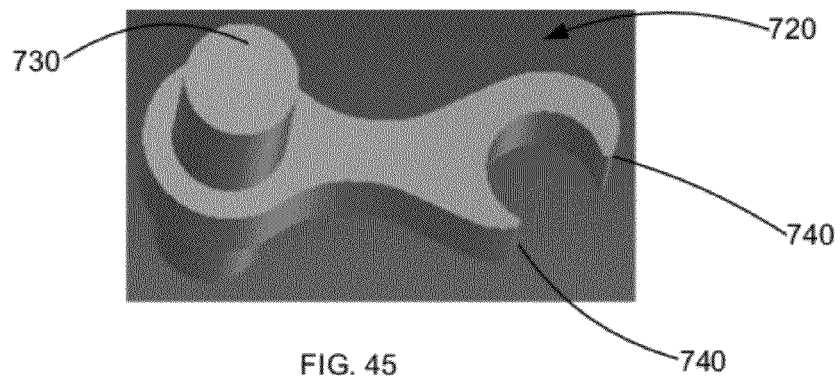
FIG. 45 is a top view of a connector assembly for latching one building component to another, according to an embodiment.

FIGS. 39, 40 and 44 illustrate a building component 800, according to another embodiment, which incorporates the connector assembly illustrated in FIGS. 37 and 38. As shown in FIGS. 39 and 40, a building component 800 can be a linear member of modular lengths and can include a variable number of connector assemblies. It is contemplated that the building component 800 can provide the skeleton, beam, column, or structural element for a project. The building component 800 in the illustrated configuration includes a main housing 812 that can be formed from first and second housing portions 814, 816, respectively. Each side of the housing 812 can be partially hollow and include one or more recesses capable of receiving one or more connector assemblies 720 (as shown in FIG. 44). In some embodiments, the first housing portion 814 and the second housing portion 816 can be aligned and snap-fitted together to form the main housing 812. Each connector assembly 720 is configured to form a releasable connection with another building component. FIG. 44 illustrates a first housing portion 814 with an inner surface including three cylinder portions 818 of varying size for receiving a shaft or axle 730 of a connector assembly 720. A portion of the inner surface of each cylinder section 818 is further recessed and is formed with internal ridges 826 capable of engaging the ridges 728 on one or more connector assemblies 720. In use, as the connector assembly 720 turns within the main cylinder portion 818 of the housing, the ridges of the connector assembly come in contact with the ridges of the housing. FIG. 44 illustrates a connector assembly 720 capable of rotating 180 degrees. In use, the shaft 730 of the connector assembly 720 can slide axially (in the direction of the longitudinal axis of the shaft 730) and rotate within the cavity of the building component 800. The connector assembly of one building component is latched to another building component by applying sufficient pressure.

Figure 42:
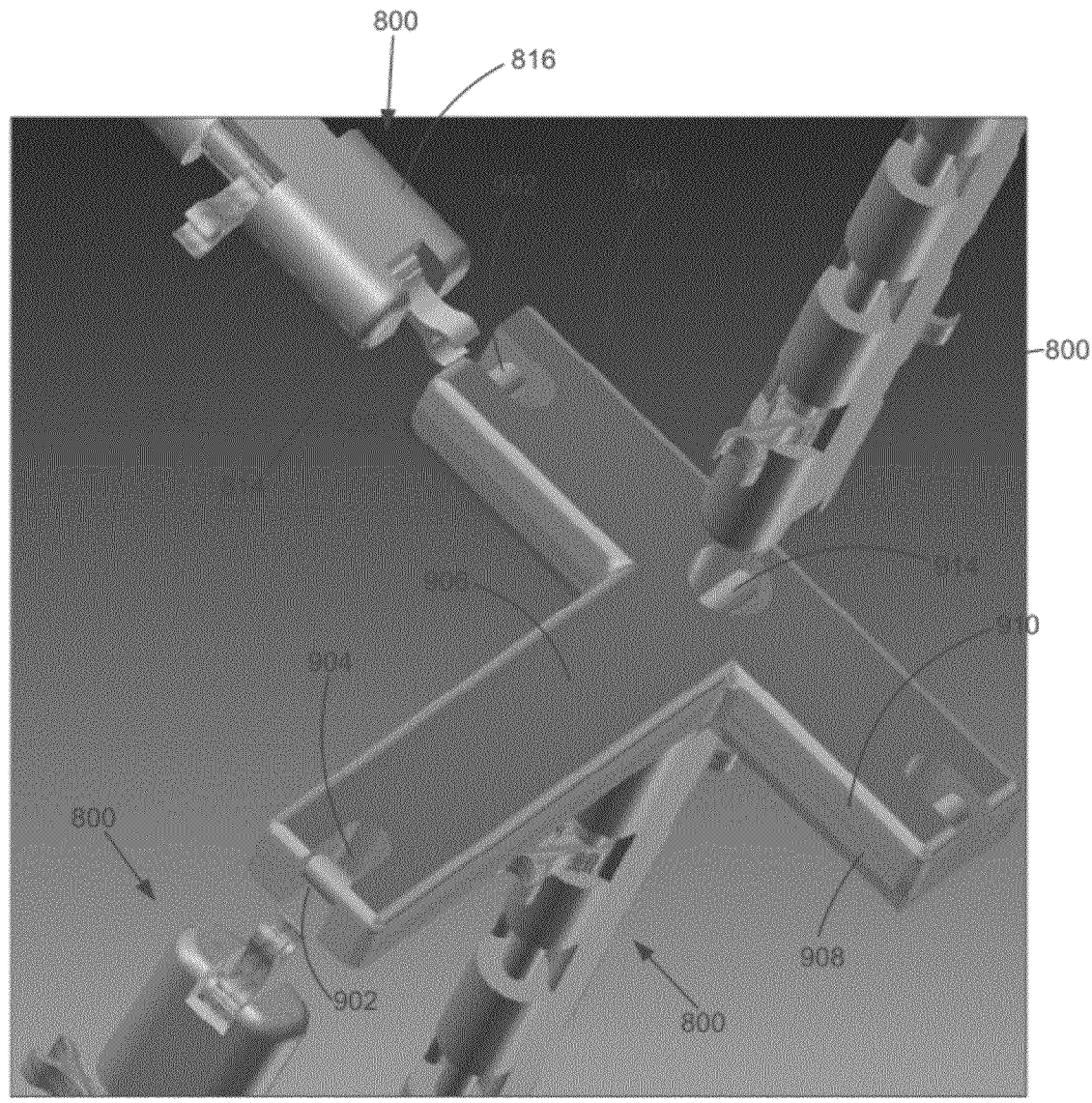
FIG. 42 is an exploded side view of an assembly to be formed from a building component of the type shown in FIG. 41 and four building components of the type shown in FIG. 40.

FIG. 41 illustrates a building component 900, according to another embodiment which can be connected to other building components, such as building component 800 as shown in FIG. 42. FIG. 42 illustrates an assembly to be formed from a building component 900 and four building components 800 of the type shown in FIG. 40. As shown in FIGS. 41 and 42, building component 900 includes a main housing 906 that can be formed from first and second housing portions 908, 910, respectively. In some embodiments, the first housing portion 908 and the second housing portion 910 can be aligned and snap-fitted together to form the main housing 906.

As illustrated in FIGS. 41 and 42, the housing 906 can include one or more openings or recesses 904, in which respective shafts or pins 902 are disposed. The shafts 902 provide a surface to which one or more connector assemblies 720 (as shown in FIG. 42) can be attached. It is contemplated that the size and shape of the building component 900 can vary depending upon the structure to be built. In some embodiments, the in the shape of a letter, such as a "T", "Y", "V", "L" or a customized shape or angle.

Figure 43:
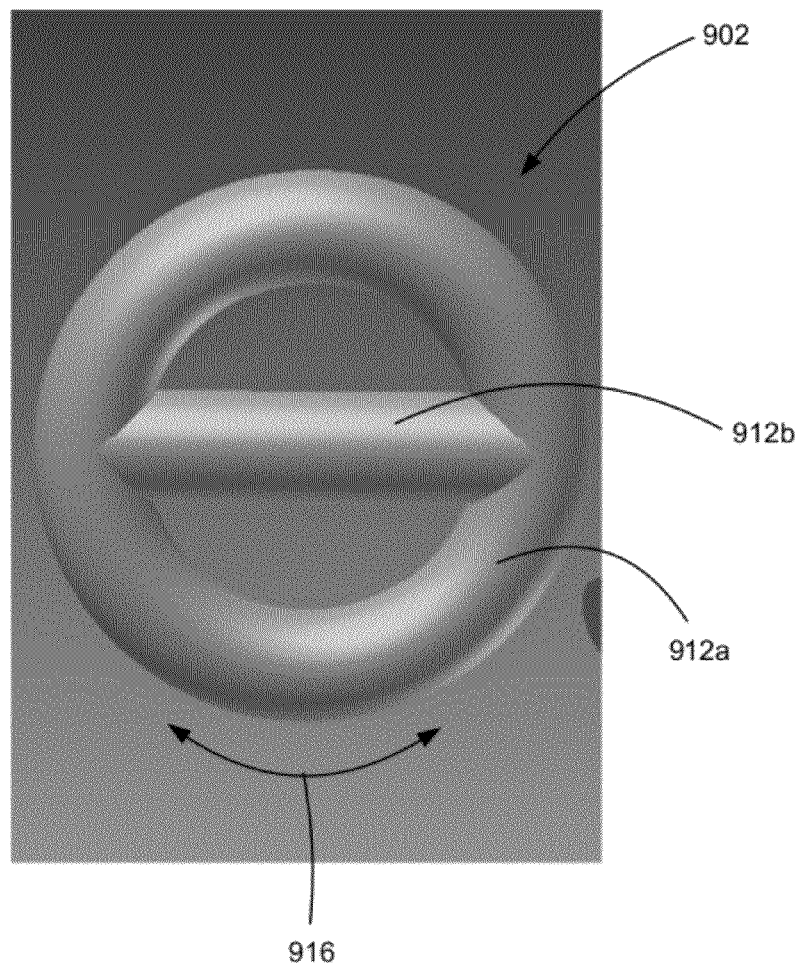
FIG. 43 is a top plan view of a circular strut union of FIG. 42.

FIG. 43 is a top plan view of a circular union member 912 (also referred to as a connector element) provided in the building component 900 to which a connector assembly of building component 800 can be connected. The circular union member 902 can be placed adjacent opening 914 within building component 900 to provide a surface to which a building component can be connected or latched from either side of building component allowing 360 degrees rotation of the connected component. The connector element 912 comprises an outer ring 912a and a shaft 912b that extends through the center of the ring. The ring 912a is placed within the housing 906 such that the ring extends around the opening 914 and the shaft 912b extends diametrically across the opening. The housing is configured to allow the connector element 912 to rotate 360 degrees, as indicated by arrow 916 in FIG. 43.

Figure 46:
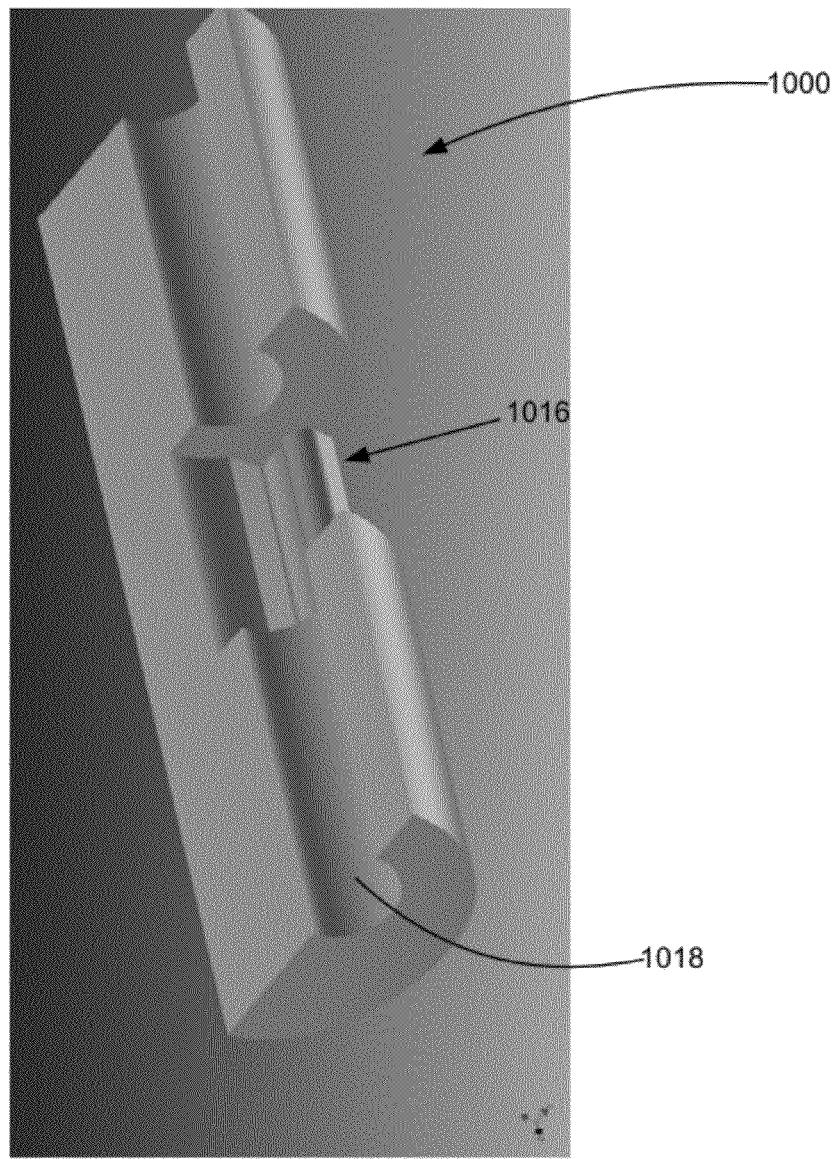
FIG. 46 is a perspective view of a housing of a building component, according to another embodiment.
Figure 47:
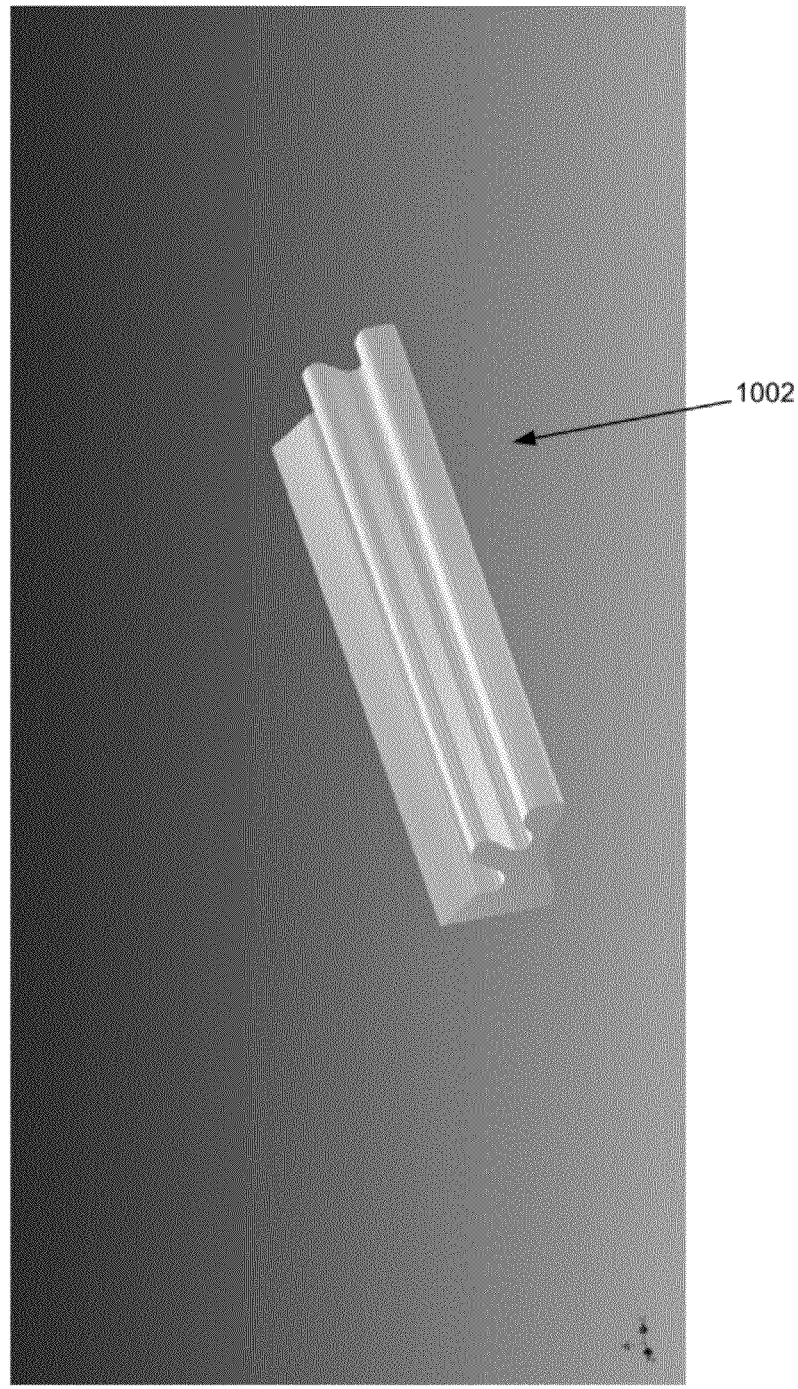
FIG. 47 is a perspective view of an indexing insert compatible with the housing of the building component of FIG. 46.
Figure 48:
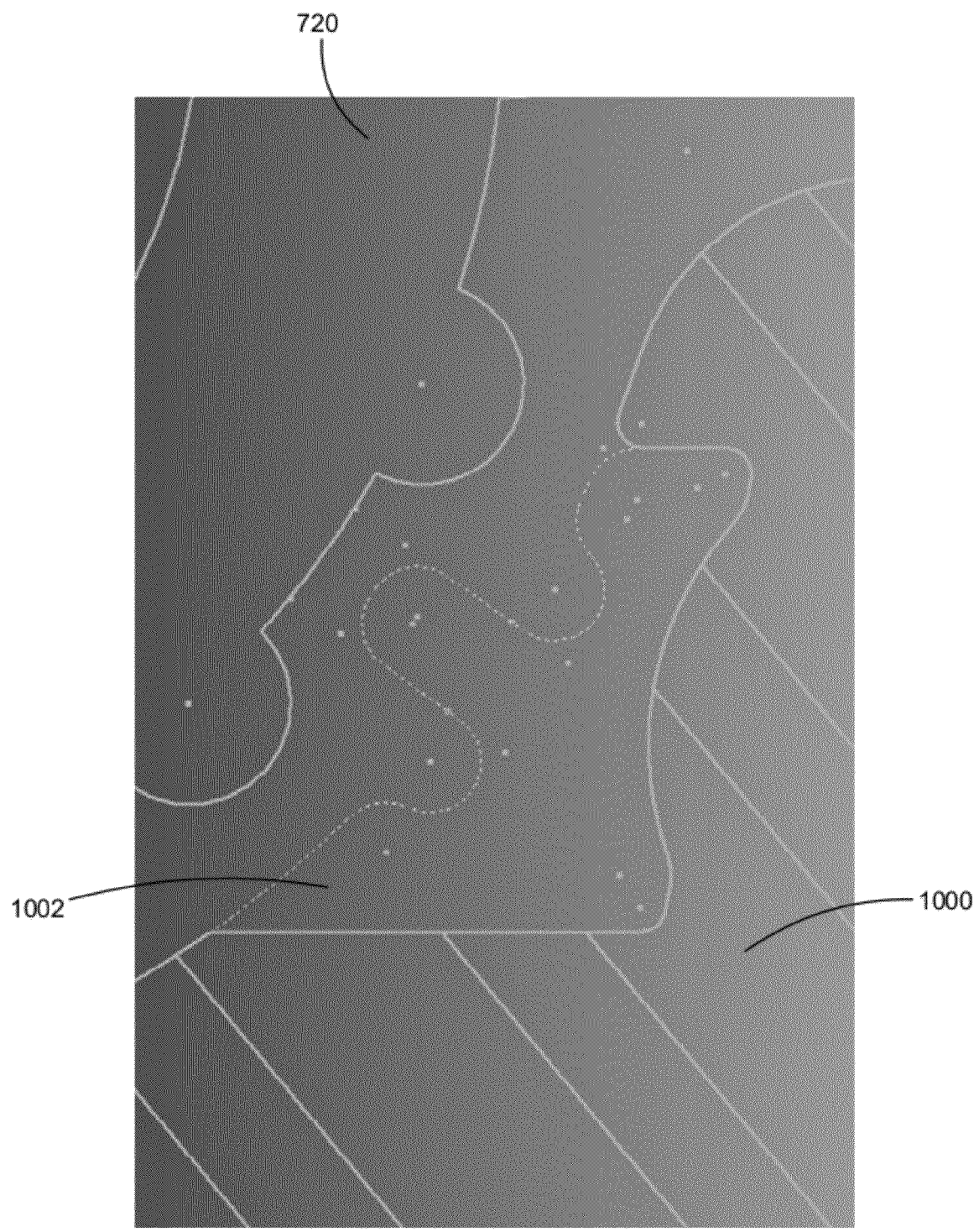
FIG. 48 is a diagram of the connection formed with a building component of the type shown in FIG. 46 and a indexing insert shown in FIG. 47.

FIG. 46 illustrates a first housing portion 1000 for a building component according to another embodiment. As illustrated, FIG. 46 shows a first housing portion 1000 which is similar to the first housing portions described herein (see FIGS. 37-41 and 44). A mating second housing portion (not shown) can be secured to the first housing portion 1000 to form the housing of a building component, as described above. The first housing portion 1000 can include an inner surface forming half of a main cylinder portion 1018 for receiving a shaft of a connector assembly. Further, the first housing portion 1000 can include a portion of the inner surface of the cylinder section 1018 having a recessed portion 1016 which can be sized and shaped to receive an indexing insert 1002 which is shown in FIG. 47. The indexing insert 1002 is formed of material that is pliable, such as an elastomeric material (e.g., rubber). As illustrated in FIG. 48, the indexing insert 1002 can be positioned into the 1016 recess, thereby providing a surface that can engage the ridges 728 of a connector arm 732. In this embodiment, the insert 1002 can be made of a relatively softer or more elastic material than the ridges 728 of the connector arm 732 to allow the connector arm 732 to rotate relative to the housing when manual pressure is applied to the connector arm, yet still apply sufficient pressure against the connector arm 732 to retain its position relative to the housing when the connector arm is being connected to the shaft of another building component.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A building component, comprising:
a housing comprising at least one recess; and
at least one connector assembly disposed within the at least one recess within the housing, wherein the at least one connector assembly comprises a shaft disposed in the at least one recess within the housing and at least one latching mechanism comprising a connector arm having first and second end portions, the first end portion being connected to the shaft, the second end portion being configured to form a releasable connection with another building component, the connector arm being pivotable relative to a longitudinal axis of the shaft in a plane perpendicular to the longitudinal axis.

2. The building component of claim 1, wherein the housing comprises a first housing portion and a second housing portion, each housing portion comprising a partially hollow inner surface which comprises the at least one recess in which the shaft is disposed.

3. The building component of claim 2, wherein the partially hollow inner surface in each housing portion comprises a first recess configured to receive the shaft of the at least one connector assembly and a second recess configured to receive the first end portion of the connector arm.

4. The building component of claim 1, wherein the first end portion comprises a pinned end portion being secured to the shaft and the second end portion comprises deformable jaws capable of forming the releasable connection with the another building component.

5. The building component of claim 4, wherein the first end portion of the connector arm includes an opening through which the shaft extends to support the connector arm for pivoting movement relative to the longitudinal axis of the shaft.

6. The building component of claim 4 wherein the deformable jaws deform away from each other when urged against the another building component to form the releasable connection.

7. The building component of claim 1, wherein the first end portion comprises a pinned end portion being secured to the shaft and the second end portion comprises a hook.

8. The building component of claim 1, wherein the first end portion of the connector arm comprises a plurality of ridges positioned along an outer edge of the first end portion.

9. The building component of claim 8, wherein the at least one recess comprises a plurality of ridges for engaging the plurality of ridges on the first end portion of the connector arm.

10. The building component of claim 1, wherein the building component is a component of a toy set.

11. The building component of claim 1, further comprising a bushing assembly for retaining the shaft in place between the first and second housing portions.

12. The building component of claim 11, wherein the bushing assembly comprises an inner main bushing having first and second recesses, a first outer bushing adjacent the first recess and a second outer bushing adjacent the second recess, wherein each outer bushing has a respective recess and a first end portion of the shaft is disposed in the first recess of the inner bushing and the recess of the first outer bushing and a second end portion of the shaft is disposed in the second recess of the inner bushing and the recess of the second outer bushing.

13. The building component of claim 12, wherein the inner main bushing comprises a third recess formed to receive the first end portion of the connector arm.

14. The building component of claim 13, further comprising at least one biasing elements disposed in the third recess in the inner main bushing and configured to exert a biasing force against the connector arm sufficient to prevent the connector arm to pivot freely about the longitudinal axis under its own weight while allowing the connector arm to be pivoted when manual pressure is applied by a user.

15. The building component of claim 13, further comprising a pair of protrusions disposed on opposite sides of the third recess in the inner main bushing wherein the pair of protrusions maintain lateral stability of each connector arm and prevent axial movement of the connector arm along the shaft.

16. The building component of claim 1, wherein the at least one latching mechanism comprises a plurality of connector arms, each having a respective first end portion connected to the shaft and being pivotable relative to the longitudinal axis of the shaft.

17. A system comprising at least first and second building components, the first building component comprising:
a first building component housing comprising at least one recess; and
at least one first building component connector assembly disposed within the at least one recess within the first building component housing, wherein the at least one first building component connector assembly comprises a shaft disposed in the at least one recess within the first building component housing component and at least one latching mechanism comprising a connector arm having first and second end portions, wherein the first end portion is connected to the shaft and a connector arm extends perpendicularly with respect to a longitudinal axis of the shaft; and
the second building component comprising:
at least one second building component connector assembly, wherein the at least one latching mechanism of the first building component connector assembly is configured to form a releasable, snap-fit connection with the second building component.

18. The system of claim 17, wherein the second end portion of the connector arm comprises deformable jaws capable of forming the releasable, snap-fit connection with the second building component.

19. The system of claim 18, wherein the first end portion of the connector arm comprises a plurality of ridges positioned along an outer edge of the first end portion to be received by a plurality of ridges disposed on the at least one recess of the first building component housing.

20. The system of claim 17, wherein the system is a toy set.

21. A method of connecting at least two building components, the method comprising:
providing a first building component, wherein the first building component comprises:

a first building component housing comprising at least one recess; and a first building component connector assembly disposed within the at least one recess within the first building component housing, wherein the first building component connector assembly comprises a shaft and at least one connector arm comprising a first end portion secured to the shaft and a second end portion of the connector arm comprising deformable jaws capable of forming a releasable, snap-fit connection with a second connector assembly of a second building component; and urging the deformable jaws against a shaft of the second connector assembly to cause the deformable jaws to form a snap-fit connection with the shaft of the second connector assembly.

* * * * *